(12) United States Patent
Zhang et al.

(10) Patent No.: US 9,439,249 B2
(45) Date of Patent: Sep. 6, 2016

(54) LED LIGHTING APPARATUS FOR USE WITH AC-OUTPUT LIGHTING BALLASTS

(71) Applicant: Cree, Inc., Durham, NC (US)

(72) Inventors: Jun Zhang, Cary, NC (US); James Andrew McBryde, Raleigh, NC (US)

(73) Assignee: Cree, Inc., Durham, NC (US)

( * ) Notice: Subject to any disclaimer, the term of this patent is extended or adjusted under 35 U.S.C. 154(b) by 105 days.

(21) Appl. No.: 13/943,455

(22) Filed: Jul. 16, 2013

(65) Prior Publication Data

US 2014/0204571 A1 Jul. 24, 2014

Related U.S. Application Data

(63) Continuation-in-part of application No. 13/749,082, filed on Jan. 24, 2013.

(60) Provisional application No. 61/840,697, filed on Jun. 28, 2013.

(51) Int. Cl.
*H05B 33/08* (2006.01)
*F21K 99/00* (2016.01)

(52) U.S. Cl.
CPC ........... *H05B 33/0809* (2013.01); *F21K 9/175* (2013.01); *Y02B 20/342* (2013.01)

(58) Field of Classification Search
CPC .............. F21K 9/175; H05B 33/0803; H05B 33/0809; H05B 33/0821; Y02B 20/342
USPC ...................................... 315/185 R
See application file for complete search history.

(56) References Cited

U.S. PATENT DOCUMENTS

| 3,283,169 A | 11/1966 | Libaw |
| 4,210,846 A | 7/1980 | Capewell et al. |
| 4,213,064 A | 7/1980 | Nagano |
| 4,392,089 A | 7/1983 | Lester et al. |
| 4,506,195 A | 3/1985 | Elms |
| 4,540,917 A | 9/1985 | Luchaco et al. |
| 4,560,908 A | 12/1985 | Stupp et al. |
| 4,682,147 A | 7/1987 | Bowman |
| 4,890,004 A | 12/1989 | Beckerman |
| 5,151,679 A | 9/1992 | Dimmick |

(Continued)

FOREIGN PATENT DOCUMENTS

| EP | 2 288 237 A2 | 2/2011 |
| JP | 2011-150852 A | 8/2011 |

(Continued)

OTHER PUBLICATIONS

International Preliminary Report on Patentability and the Written Opinion of the International Searching Authority Corresponding to International Application No. PCT/US2012/068991, Date of Mailing: Mar. 4, 2013, 9 pages.

(Continued)

*Primary Examiner* — John Poos
*Assistant Examiner* — David Mattison
(74) *Attorney, Agent, or Firm* — Myers Bigel & Sibley, P.A.

(57) ABSTRACT

An apparatus for interfacing a ballast to at least one light emitting diode (LED) includes a passive rectifier circuit and matching circuit coupled to an input port and/or an output port of the passive rectifier circuit and configured to at least partially match an impedance of the ballast.

17 Claims, 17 Drawing Sheets

(56) References Cited

U.S. PATENT DOCUMENTS

| | | | |
|---|---|---|---|
| 5,404,082 A | 4/1995 | Hernandez et al. |
| 5,408,403 A | 4/1995 | Nerone et al. |
| 5,466,992 A | 11/1995 | Nemirow |
| 5,488,269 A | 1/1996 | El-Hamamsy et al. |
| 5,598,326 A | 1/1997 | Liu et al. |
| 5,734,230 A | 3/1998 | Edwards et al. |
| 5,739,639 A | 4/1998 | Johnson |
| 5,808,417 A | 9/1998 | Ference et al. |
| 5,847,550 A | 12/1998 | Schie et al. |
| 5,895,986 A | 4/1999 | Walters et al. |
| 5,925,990 A | 7/1999 | Crouse et al. |
| 6,051,938 A | 4/2000 | Arts et al. |
| 6,069,453 A | 5/2000 | Arts et al. |
| 6,124,678 A | 9/2000 | Bishop et al. |
| 6,320,330 B1 | 11/2001 | Haavisto et al. |
| 6,333,605 B1 | 12/2001 | Grouev et al. |
| 6,362,575 B1 | 3/2002 | Chang et al. |
| 6,411,045 B1 | 6/2002 | Nerone |
| 6,507,157 B1 | 1/2003 | Erhardt et al. |
| 6,509,657 B1 | 1/2003 | Wong et al. |
| 6,936,968 B2 | 8/2005 | Cross et al. |
| 7,027,010 B2 | 4/2006 | Lee |
| 7,067,992 B2 | 6/2006 | Leong |
| 7,138,994 B2 | 11/2006 | Cho et al. |
| 7,507,001 B2 | 3/2009 | Kit |
| 7,511,971 B2 | 3/2009 | Lim |
| 7,863,832 B2 | 1/2011 | Lane et al. |
| 8,089,213 B2 | 1/2012 | Park |
| 8,310,172 B2 | 11/2012 | Negrete |
| 8,322,878 B2 | 12/2012 | Hsia |
| 8,358,056 B2 | 1/2013 | Park |
| 8,461,794 B2 | 6/2013 | Schrod et al. |
| 2003/0057888 A1 | 3/2003 | Archenhold et al. |
| 2003/0117084 A1 | 6/2003 | Stack |
| 2003/0193245 A1 | 10/2003 | Powers |
| 2003/0197447 A1 | 10/2003 | Yamamoto |
| 2004/0170015 A1 | 9/2004 | Hamrick |
| 2004/0178766 A1 | 9/2004 | Bucur et al. |
| 2005/0029966 A1 | 2/2005 | Buonocunto |
| 2005/0068459 A1 | 3/2005 | Holmes et al. |
| 2005/0135103 A1 | 6/2005 | Evans |
| 2005/0200308 A1 | 9/2005 | Rimmer et al. |
| 2006/0066258 A1 | 3/2006 | Lane et al. |
| 2007/0138972 A1 | 6/2007 | Siessegger |
| 2007/0152604 A1 | 7/2007 | Tatsumi |
| 2007/0182338 A1 | 8/2007 | Shteynberg et al. |
| 2007/0273290 A1 | 11/2007 | Ashdown et al. |
| 2008/0055077 A1 | 3/2008 | Lane et al. |
| 2008/0122376 A1 | 5/2008 | Lys |
| 2008/0224617 A1 | 9/2008 | Keller et al. |
| 2008/0258628 A1 | 10/2008 | Higley et al. |
| 2008/0266849 A1 | 10/2008 | Nielson et al. |
| 2008/0276509 A1 | 11/2008 | Yu |
| 2008/0295371 A1 | 12/2008 | Hsu |
| 2009/0033239 A1* | 2/2009 | Gwisdalla ............ H01R 33/942 315/246 |
| 2009/0085490 A1 | 4/2009 | Awalt et al. |
| 2009/0128057 A1 | 5/2009 | Valdez |
| 2009/0296384 A1 | 12/2009 | Van de Ven et al. |
| 2010/0079091 A1 | 4/2010 | Deixler et al. |
| 2010/0096976 A1* | 4/2010 | Park .................. H05B 33/0803 313/498 |
| 2010/0135000 A1 | 6/2010 | Smith, III et al. |
| 2010/0194296 A1 | 8/2010 | Park |
| 2010/0237840 A1 | 9/2010 | Walter et al. |
| 2010/0244569 A1 | 9/2010 | Chandler et al. |
| 2010/0244981 A1 | 9/2010 | Gorbachov |
| 2010/0259239 A1 | 10/2010 | Shi et al. |
| 2010/0270941 A1* | 10/2010 | Hui .................... H05B 33/0809 315/291 |
| 2010/0271802 A1 | 10/2010 | Recker et al. |
| 2010/0277070 A1 | 11/2010 | Butteris et al. |
| 2010/0301751 A1 | 12/2010 | Chobot et al. |
| 2011/0006691 A1 | 1/2011 | Blaha et al. |
| 2011/0043035 A1 | 2/2011 | Yamada et al. |
| 2011/0043136 A1 | 2/2011 | Radermacher |
| 2011/0062888 A1 | 3/2011 | Bondy et al. |
| 2011/0080116 A1 | 4/2011 | Negley et al. |
| 2011/0109164 A1 | 5/2011 | Mohammed Suhura et al. |
| 2011/0121654 A1 | 5/2011 | Recker et al. |
| 2011/0121754 A1 | 5/2011 | Shteynberg et al. |
| 2011/0121756 A1 | 5/2011 | Thomas |
| 2011/0140611 A1 | 6/2011 | Elek et al. |
| 2011/0140612 A1 | 6/2011 | Mohan et al. |
| 2011/0232143 A1 | 9/2011 | Hsu |
| 2011/0254461 A1 | 10/2011 | Summerland et al. |
| 2011/0309760 A1 | 12/2011 | Beland et al. |
| 2012/0008315 A1 | 1/2012 | Simon et al. |
| 2012/0153854 A1 | 6/2012 | Setomoto et al. |
| 2012/0161666 A1* | 6/2012 | Antony .............. H05B 33/0809 315/294 |
| 2012/0242241 A1 | 9/2012 | Schmacht |
| 2012/0274237 A1 | 11/2012 | Chung et al. |
| 2012/0280637 A1 | 11/2012 | Tikkanen et al. |
| 2012/0286668 A1 | 11/2012 | Kondo |
| 2012/0306403 A1 | 12/2012 | Chung et al. |
| 2012/0313520 A1 | 12/2012 | Canter et al. |
| 2013/0043803 A1 | 2/2013 | Raj |
| 2013/0049613 A1 | 2/2013 | Reed |
| 2013/0063027 A1 | 3/2013 | Recker et al. |
| 2013/0113390 A1 | 5/2013 | Oh et al. |
| 2013/0119868 A1 | 5/2013 | Saxena et al. |
| 2013/0214697 A1 | 8/2013 | Archenhold |
| 2013/0313983 A1* | 11/2013 | Radermacher ............ F21K 9/17 315/187 |
| 2014/0132164 A1 | 5/2014 | McBryde et al. |
| 2014/0203714 A1 | 7/2014 | Zhang et al. |
| 2014/0204571 A1 | 7/2014 | Zhang et al. |
| 2014/0300655 A1 | 10/2014 | Kato |
| 2015/0008844 A1 | 1/2015 | Wilson |
| 2015/0015076 A1 | 1/2015 | Park |
| 2015/0015145 A1 | 1/2015 | Carrigan et al. |
| 2015/0021988 A1 | 1/2015 | Barnetson et al. |
| 2015/0048685 A1 | 2/2015 | Wilson |
| 2015/0091463 A1 | 4/2015 | Jin |

FOREIGN PATENT DOCUMENTS

| | | |
|---|---|---|
| WO | WO 2009/010802 A2 | 1/2009 |
| WO | WO 2010/127366 A2 | 11/2010 |
| WO | WO 2010/139080 A1 | 12/2010 |
| WO | WO 2011/124721 A1 | 10/2011 |
| WO | WO 2012/104800 A2 | 8/2012 |
| WO | WO 2012/110973 A1 | 8/2012 |
| WO | WO 2013/124827 A1 | 8/2013 |
| WO | 2014115010 | 7/2014 |
| WO | WO 2014/115010 A1 | 7/2014 |

OTHER PUBLICATIONS

Notification of Transmittal of the International Search Report and the Written Opinion of the International Searching Authority, or the Declaration, PCT/US13/68904, Date of Mailing: Mar. 19, 2014, 9 pages.

Notification of Transmittal of the International Search Report and the Written Opinion of the International Searching Authority, or the Declaration, PCT/US13/68910, Date of Mailing: Apr. 4, 2014, 13 pages.

Notification of Transmittal of the International Search Report and the Written Opinion of the International Searching Authority, or the Declaration, PCT/US13/68905, Date of Mailing: Apr. 7, 2014, 12 pages.

International Search Report and Written Opinion Corresponding to International Application No. PCT/US2014/060594; Date of Mailing: Jan. 16, 2015; 9 Pages.

Chen N. et al., "A Driving Technology for Retrofit LED Lamp for Fluorescent Lighting Fixtures With Electronic Ballasts", *IEEE Transactions on Power Electronics*, vol. 26, No. 2, Feb. 2011, 588-601.

International Search Report and Written Opinion Corresponding to International Application No. PCT/US12/68987; Date of Mailing; Feb. 26, 2013; 14 Pages.

(56) References Cited

OTHER PUBLICATIONS

International Search Report Corresponding to International Application No. PCT/US2012/069126; Date of Mailing: Feb. 20, 2013; 17 Pages.
International Search Report Corresponding to International Application No. PCT/US12/68991; Date of Mailing: Mar. 4, 2013; 10 Pages.
Invitation to Pay Additional Fees Corresponding to International Application No. PCT/US12/68984; Date of Mailing: Feb. 1, 2013; 2 Pages.
Johnson B., "Controlling power and cost for multiple LEDs", *EE Times*, Nov. 5, 2006, Retrieved on Feb. 6, 2013 from URL, http://eetimes.com/design/power-management-design/4012121/Controlling-power-and-cost-for-multiple-LEDs?pageNumber.
Notification of Transmittal of the International Search Report and the Written Opinion of the International Searching Authority, or the Declaration, PCT/US12/68984, May 10, 2013.
Ribarich; *Driver—Off-Line LED Control Circuit*; LED Professional Review; Jan./Feb. 2009; pp. 21-24.
International Preliminary Report on Patentability Corresponding to International Application No. PCT/US2013/068910; Date of Mailing: May 28, 2015; 12 Pages.
Capacitor-Input Filter, Dec. 12, 2011, http://en.wikipedia.org/w/index.php?title=Capacitor-input_filter&oldid=465397872.
Galvanic Isolation, Sep. 12, 2011, http://en.wikipedia.org/w/index/php?title-Galvanic_isolation&oldid=449965801.
Kuphaldt T. Lessons in Electric Circuits, vol. II-AC, Chapter 7: Mixed-Frequency AC Signals, Chapter 9: Transformers, pp. 152-188, 217-281, Jul. 25, 2007, http://www.lbiblio.org/kuphaldt/electricCircuits/AC/AC.pdf.
Malvino et al. 2008, Basic Electronics (MSBTE), 3-12 Series Inductor Filter, pp. 94-95, Tata McGraw-Hill Company Limited.
Niknejad A., Electromagnetics for High-Speed Analog and Digital Communication Circuit, Chapter 7: Resoncance and Impedance Matching, Chapter 10: Transformers, pp. 168-200, 293-319, 2007, Cambridge University Press.
Zhu et al. "Novel Capacitor-Isolated Power Converter", pp. 1824-1829, Sep. 2010, Energy Conversion Congress and Exposition (ECCE), 2010 IEEE held in Atlanta, GA.
Third Party Submission Filed on Apr. 17, 2015 Corresponding to U.S. Appl. No. 14/256,573, 9 pages.
Third Party Submission Filed on Jun. 4, 2015 Corresponding to U.S. Appl. No. 14/256,573, 12 pages.
Third Party Submission Filed on Jun. 9, 2015 Corresponding to U.S. Appl. No. 13/749,082, 27 pages.
Third Party Submission Filed on May 20, 2015 Corresponding to U.S. Appl. No. 13/749,082, 14 pages.
Notification Concerning Transmittal of International Preliminary Report on Patentability, PCT/US2013/Q68905, Aug. 6, 2015, 11 pages.
Pyakurayal et al, Filter Design for AC to DC Converter, pp. 42-49, Jun. 22, 2013, IRJES, http://www.irjes.com/Papers/vol2-issue6/Version-1/E02064249.pdf, vol. 2:6.
Impedance Matching, Nov. 16, 2012, http://en.wikipedia.org/w/index.php?title=Impedance_matching&oldid=523347621.
Lee et al, Robust Passive LED Driver Compatable with Conventional Rapid-Start Ballast, pp. 3694-3706, Dec. 2011, IEEE Trans. on Power Electronics, vol. 26:12.
Vishay Intergechnology, AC Film Capacitors in Connection with the Mains, pp. 301-303, Jan. 7, 2009, Vishay Intertechnology, http://www.eettaiwan.com/STATIC/PDF/200903/20090304_Vishay_AN02.pdf?Sources=DOWNLOAD.
A. Vitanza et al, Electronic Fluorescent Lamp Ballast, pp. 1-10, 1999, STMicroelectronics Application Note AN427/1294, http://ww.st.com/static/acdtive/cn/resource/technical/document/application_note/CD00003901.pdf.
Horowitz et al., The Art of Electronics, p. 32, 1989, Cambridge University Press, Cambridge.
Zhang et al, A Capacitor-Isolated LED Driver with Inherent Current Balance Capability, pp. 1708-1716, Apr. 2012, IEEE Trans. Indust. Electronics vol. 59.
Lee et al, Robust Passive LED Driver Compatible with Conventional Rapid-Start Ballast, pp. 3694-3706, Dec. 2011, IEEE Trans. on Power Electronics, vol. 26:12.
Capacitor-Input Filter, Dec. 4, 2012, http://en.wikipedia.org/w/index.php?title=Capacitor-input_filter&oldid=526350197.
AC Film Capacitors in Connection with Mains, Jan. 7, 2009, pp. 301-303, Vishay Intertechnology, Inc., http://www.eetaiwan.com/STATIC/PDF/200903/20090304_Vishay_AN02.pdf?SOURCES=DOWNLOAD.
Chan, Design of Differential Filters for High-Speed Signal Chains, Application Report SLWA053B, Apr. 2010, http://www.ti.com/lit/an/slwa053b/slwa053b.pdf.
Chen, A Driving Technology for Retrofit LED Lamp for Fluorescent Lighting Fixtures with Electronic Ballasts, pp. 588-601, IEEE Trans. On Power Electronics, vol. 26:2.
Lee, Robust Passive LED Driver Compatible with Conventional Rapid-Start Ballast, pp. 3694-3706, Dec. 2011, IEEE Trans. On Power Electronics, vol. 26:12.
Pyakuryal et al., Filter Design for AC to DC Converter, vol. 2:6, pp. 42-49, Jun. 22, 2013, IRJES, http://www.irjes.com/Papers/vol2-issue6/Version-1,E02064249.pdf.
The Inductor, p. 3, Nov. 20, 2012, http://www.talkingelectronics.com/projects/inductor/inductor-3.html.
Zhang et al., A Capacitor-Isolated LED Driver with Inherent Current Balance Capability, pp. 1708-1716, Apr. 2012, IEEE Trans. Indust. Electronics vol. 59.
Taiwanese Office Action Corresponding to Application No. 103135868; Mailing Date: Nov. 24, 2015; Foreign Text, 12 Pages.
European Search Report Corresponding to European Patent Application No. 12 85 7833; Dated Nov. 20, 2015; 9 Pages.
European Search Report Corresponding to European Patent Application No. 12 85 8507; Dated Nov. 30, 2015; 7 Pages.
Extended European Search Report Corresponding to European Application No. 12857535.4, Dated: Jul. 7, 2016; 7 Pages.
European Search Report Corresponding to European Patent Application No. 13 87 3105; Dated: Jul. 12, 2016; 7 Pages.

* cited by examiner

LED LIGHTING APPARATUS FOR USE WITH AC-OUTPUT LIGHTING BALLASTS

CROSS-REFERENCE TO RELATED APPLICATIONS

The present application is a continuation-in-part of U.S. patent application Ser. No. 13/749,082 entitled LED LIGHTING APPARATUS FOR USE WITH AC-OUTPUT LIGHTING BALLASTS, filed Jan. 24, 2013 and claims priority to U.S. Provisional Application Ser. No. 61/840,697, filed Jun. 28, 2013, entitled "LED LIGHTING APPARATUS FOR USE WITH AC-OUTPUT LIGHTING BALLASTS".

FIELD

The present inventive subject matter relates to lighting apparatus and methods and, more particularly, to solid-state lighting apparatus and methods.

BACKGROUND

Solid-state lighting arrays are used for a number of lighting applications. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent tubes have also been developed, as shown, for example, in U.S. Pat. Nos. 6,936,968, 7,507,001, and U.S. Patent Application Publication No. 2008/0266849, which describe various types of LED replacements for use in fluorescent light fixtures.

SUMMARY

Some embodiments provide an apparatus for interfacing a ballast to at least one light emitting diode (LED). The apparatus includes a passive rectifier circuit and matching circuit coupled to the passive rectifier circuit and configured to at least partially match an impedance of the ballast. In some embodiments, the matching circuit may be configured to couple the at least one LED to the passive rectifier circuit. In some embodiments, the passive rectifier circuit may be configured to couple the at least one LED to the matching circuit. In further embodiments, the matching circuit may include components on input and output sides of the passive rectifier circuit.

According to some embodiments, the matching circuit includes at least one inductor and/or at least one capacitor. For example, the matching circuit may include at least one inductor coupled in series with an input of the passive rectifier circuit and/or an output of the passive rectifier circuit. In some embodiments, the matching circuit may include at least one capacitor coupled at an output of the passive rectifier circuit and/or at an input of the passive rectifier circuit.

In further embodiments, the apparatus may include a transformer configured to couple the passive rectifier circuit to the ballast. The matching circuit may include an inductance of the transformer. In some embodiments, the matching circuit may couple the transformer to the passive rectifier circuit. In further embodiments, the passive rectifier circuit may couple the transformer to the matching circuit.

Further embodiments provide a lighting apparatus including a passive rectifier circuit and matching circuit as described above in combination with at least one LED. The at least one LED may include a string of serially-connected LEDs. The at least one LED and at least a portion of the passive rectifier circuit and the matching circuit may be integrated in a lamp. The at least one LED may be included in a lamp and at least a portion of the passive rectifier circuit and the matching circuit may be included in an adapter configured to be coupled between the lamp and the ballast.

Some embodiments provide a lamp including an elongate housing, at least one electrical contact positioned proximate at least one of first and second ends of the housing and at least one light emitting diode (LED) positioned in the housing and configured to provide illumination. The lamp further includes an impedance matching passive rectifier circuit at least partially contained within the housing and coupled to the at least one LED and the at least one electrical contact. The housing may include first and second end caps proximate respective ones of the first and second ends and the impedance matching passive rectifier circuit may be at least partially contained within at least one of the end caps. For example, the impedance matching passive rectifier circuit may include first and second portions contained within respective ones of the first and second end caps.

A substrate may be contained within the housing and the at least one LED may be mounted on the substrate. At least a portion of the impedance matching passive rectifier circuit may be mounted on the substrate. The substrate may include a flexible substrate.

In still further embodiments, an apparatus includes a housing and an impedance matching passive rectifier circuit supported by the housing configured to electrically couple a lamp comprising at least one LED to wiring of a fluorescent light fixture. The impedance matching passive rectifier circuit may be configured to be connected to at least one lamp tombstone connector of the fluorescent lighting fixture, and may include a passive rectifier circuit and a matching circuit coupled to the passive rectifier circuit and configured to at least partially match an impedance of a ballast of the fluorescent light fixture.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
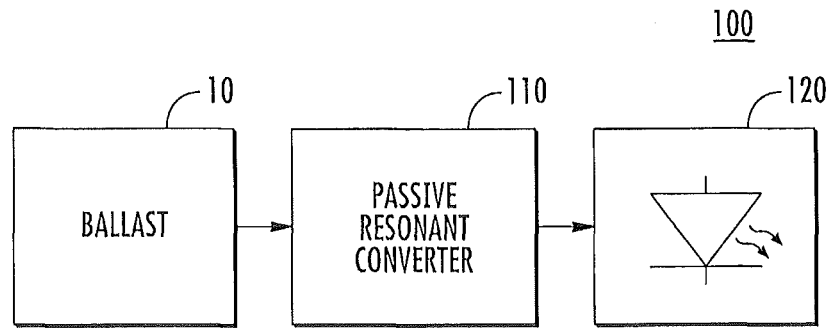
FIG. 1 is a schematic diagram illustrating a lighting apparatus according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

FIG. 1 illustrates a lighting apparatus 100 according to some embodiments of the inventive subject matter. The apparatus 100 includes at least one solid-state lighting device, here illustrated as at least one light emitting diode (LED) 120, which is configured to provide illumination in a light fixture or other configuration. The apparatus 100 further includes a passive resonant converter circuit 110, which has an input configured to be coupled to a lamp ballast 10, such as an electronic ballast as may be used in a fluorescent or other gas-discharge lighting device. For example, the ballast 10 may be one included in an existing fluorescent lighting fixture that is being retrofitted to use the at least one LED 120 as a replacement for at least one fluorescent tube or compact fluorescent lamp (CFL). The passive resonant converter circuit 110 has an output coupled to the at least one LED 120. In various embodiments, for example, the passive resonant converter circuit 110 may be a passive resonant rectifier configured to provide a rectified and filtered AC current through the at least one LED 120 from a high-frequency AC input generated by the ballast 10. The passive resonant converter circuit 110 may be configured to provide current to the at least one LED 120 without performing voltage or current regulation, unlike, for example, an active DC power supply. In some embodiments, the passive resonant converter circuit 110 may be configured to substantially match an output impedance of the ballast 10, thus providing a relatively efficient power transfer and control of power transfer between the ballast 10 and the at least one LED 120. Generally, the current through the at least one LED 120 is a function of the inductance, capacitance and the LED voltage, with the power delivered to the LED being a function of the LED current and voltage.

Figure 2:
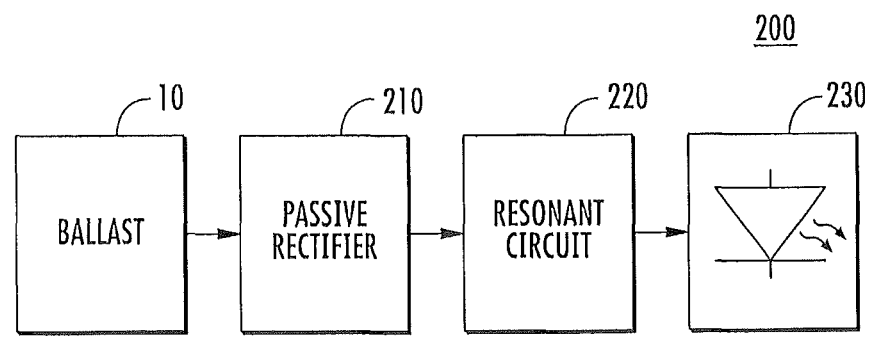
FIG. 2 is a schematic diagram illustrating a lighting apparatus according to further embodiments.

Referring to FIG. 2, a passive resonant converter circuit may comprise a passive resonant rectifier circuit including a combination of a passive rectifier circuit 210 and a resonant circuit 220. As shown in FIG. 2, an input of the passive rectifier circuit 210 may be coupled to a lamp ballast 10, and an input of the resonant circuit 220 may be coupled to an output of the passive rectifier circuit 210. At least one LED 230 may be coupled to an output of the resonant circuit 220. In some embodiments, the arrangement of the rectifier circuit 110 and the resonant circuit 220 may be reversed, i.e., the resonant circuit 220 may be connected to a ballast 10, with the rectifier circuit 210 being connected between the resonant circuit 220 and the at least one LED 230. In some embodiments, the ballast 10 may be an electronic ballast including a resonant AC/AC power supply of the type commonly used in fluorescent, high intensity discharge (HID) and other gas discharge lighting application. The resonant circuit 220 may be configured to provide impedance matching for an output of the ballast 10, which may include, for example, a resonant LC output circuit.

Figure 3:
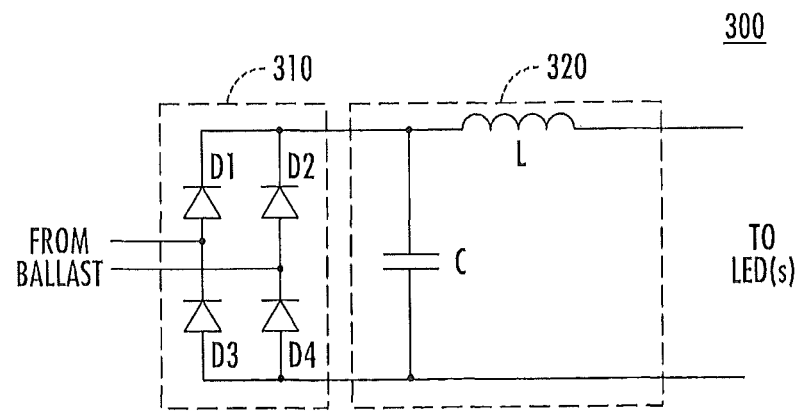
FIG. 3 is a schematic diagram illustrating a passive resonant converter circuit according to some embodiments.

FIG. 3 illustrates an implementation of a passive resonant converter 300 according to some embodiments. The converter 300 includes a passive diode bridge full-wave rectifier circuit 310 including diodes D1, D2, D3, D4. A first port of the rectifier circuit 210 is configured to be coupled to a lamp ballast. A second port of the rectifier circuit 310 is coupled to an input port of a resonant circuit 320. As shown, the resonant circuit 320 includes a CL filter circuit including a capacitor C and an inductor L connected in a parallel/series arrangement. An output port of the resonant circuit 320 is configured to be coupled to at least one LED, for example, a string of serially connected LEDs. It will be appreciated that the rectifier circuit 310 and/or the resonant circuit 320 may take other forms. For example, the resonant circuit 320 may comprise other types of resonant circuits, such as series resonant circuits or other arrangements. In some embodiments, the resonant circuit 320 may be configured to provide impedance matching with a resonant tank output circuit in the ballast.

Figure 4:
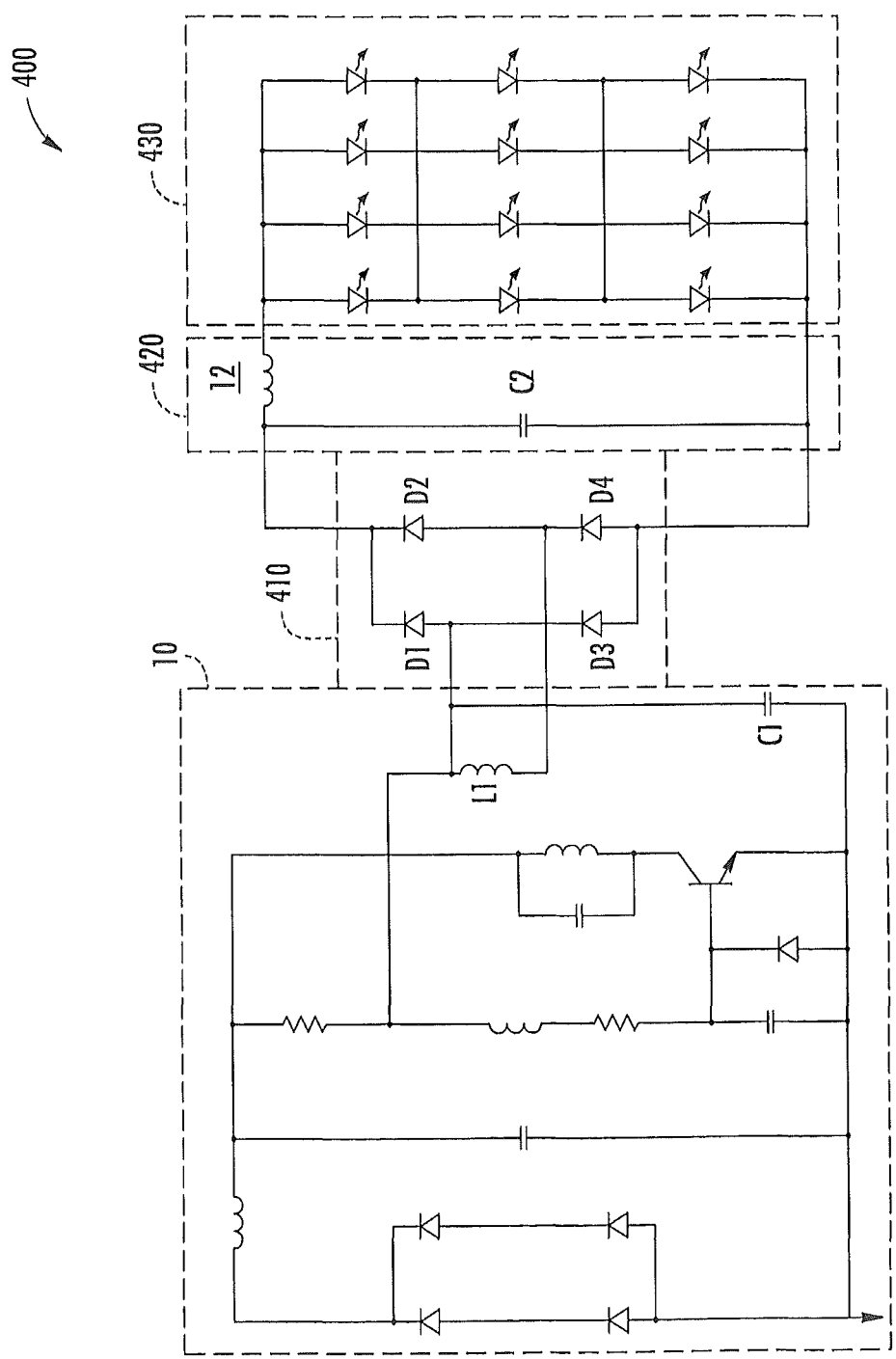
FIG. 4 is a schematic diagram illustrating a lighting apparatus used with a first type of fluorescent lamp ballast according to some embodiments.

FIG. 4 illustrates an example of implementation of a lighting apparatus 400 according to some embodiments with an electronic ballast 10 of a type commonly used in fluorescent lighting fixtures. As shown, the ballast 10 comprises an oscillator circuit having a series resonant output circuit including a capacitor C1 and an inductor L1. The lighting apparatus 400 includes a passive diode bridge full wave rectifier circuit 410 including diodes D1, D2, D3, D4, which is configured to be coupled to the ballast 10. A resonant parallel/series CL circuit 420 including a capacitor C2 and an inductor L2 is coupled to an output of the rectifier circuit 410. An LED lighting assembly 430 including a plurality of serially and parallel connected LEDs is coupled to the resonant circuit 420. Unlike low-pass LC filters in which an inductor is coupled in series with a parallel combination of a capacitor and the load, the resonant circuit 420 is in the form of a CL filter, with the capacitor C in parallel with the output of the rectifier 410 and the inductor L2 in series with the LED assembly 430. The CL form for the resonant circuit 420 may be particularly advantageous because the ballast 10 may have a relatively high source impedance, while the LED assembly 430 may present a relatively low load impedance. Placing the capacitor C between the inductor L2 and the ballast 10 can reduce voltage oscillations and provide additional impedance control.

Figure 5:
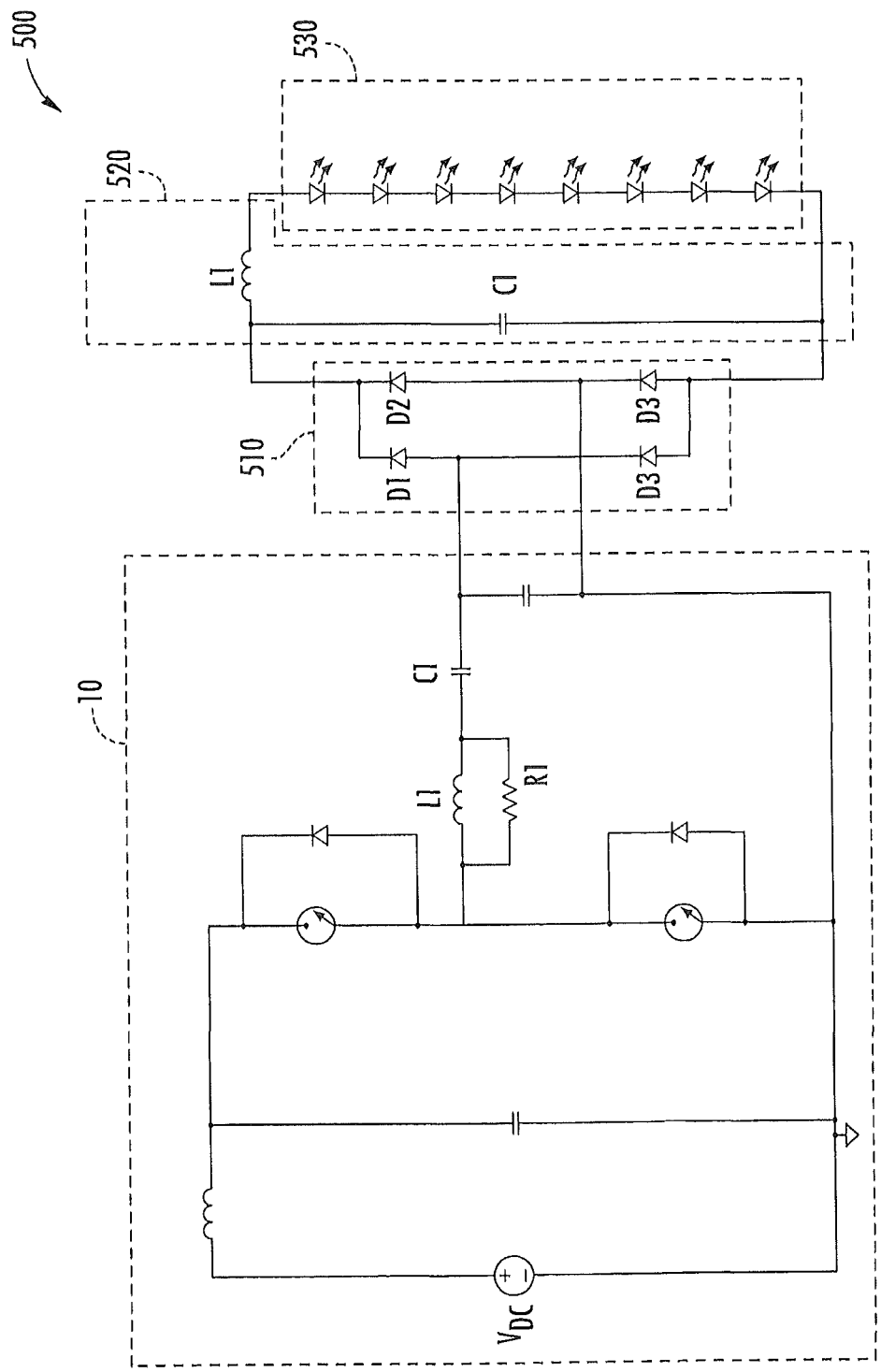
FIG. 5 is a schematic diagram illustrating a lighting apparatus used with a second type of fluorescent lamp ballast according to further embodiments.

As further shown in FIG. 4, a blocking capacitor $C_B$ may be connected between the diode bridge and the ballast 10. The blocking capacitor $C_B$ may be used to block lower-frequency AC currents which may be undesirable for the operation of the LED assembly 430. Such a blocking capacitor may also be useful, for example, to prevent use of the lighting apparatus 400 with an older non-electronic ballast that produces a relatively low frequency (e.g., 50/60 Hz) output instead of the significantly higher frequency outputs produced by typical electronic ballasts, which may be more suitable for driving LEDs, FIG. 5 illustrates another lighting apparatus 500 interfaced with another type of electronic ballast 10, which uses a half-bridge output circuit that drives a load through a resonant circuit including an inductor L1 and a capacitor C1 and a resistor R1. The lighting apparatus 500 includes a passive diode bridge rectifier circuit 510 including diodes D1, D2, D3, D4. A resonant circuit 520 including a parallel capacitor C2 and a series inductor L2 couples the rectifier circuit 510 to an LED assembly 530, here shown as a serial string of LEDs. As shown, the apparatus 500 may also include a blocking capacitor $C_B$, which may function as described above with reference FIG. 4.

Figure 6:
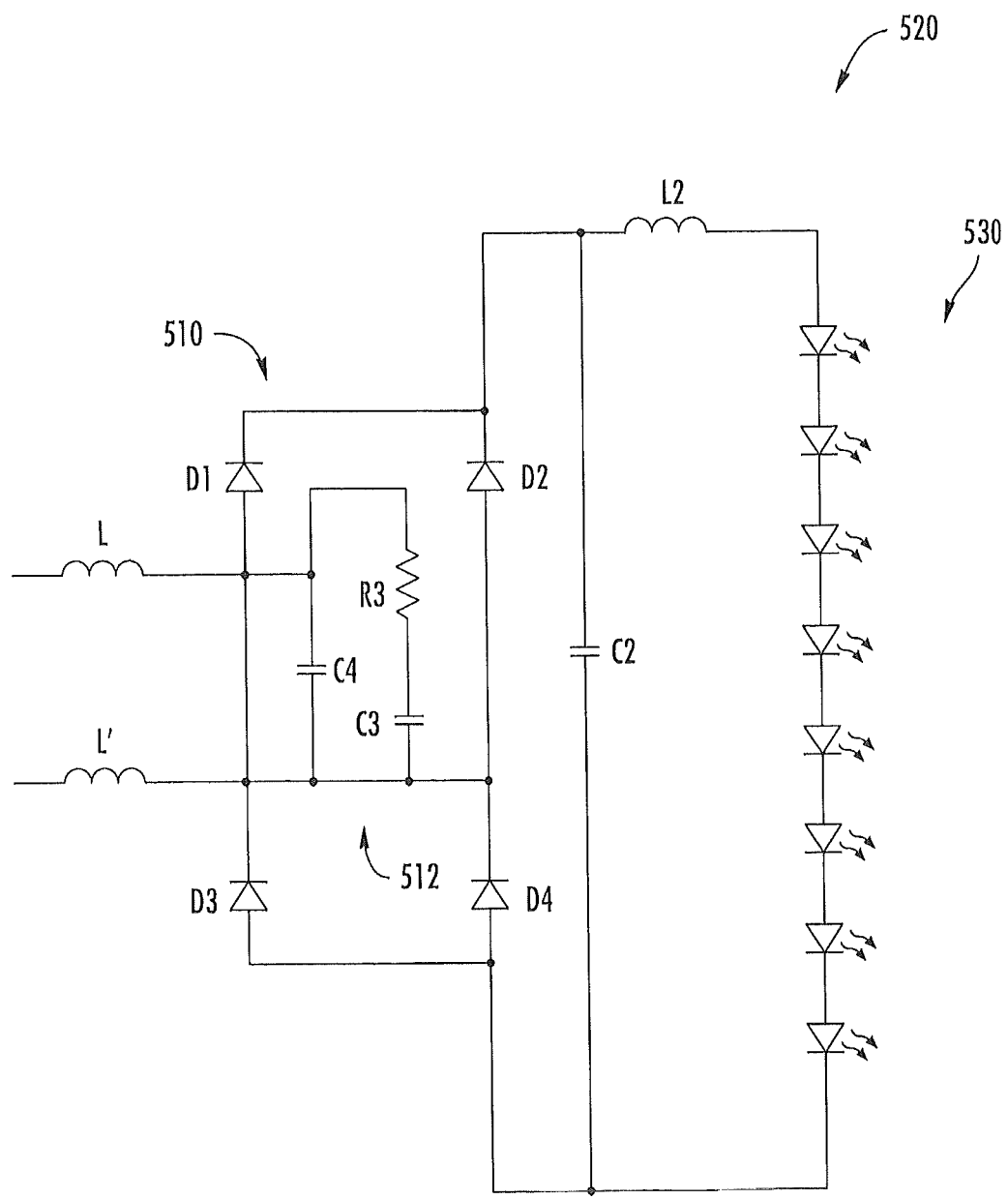
FIG. 6 is a schematic diagram illustrating a lighting apparatus with snubber protection according to further embodiments.

In certain applications, such as in replacement lamp applications in fluorescent troffer-type fixtures, wires leading from the ballast may provide significant inductance, which may lead to undesirable voltages being generated at the input of lighting circuitry configured as described above. According to some embodiments, as shown in FIG. 6, a lighting apparatus 600 may include a rectifier circuit 510 and a resonant circuit 520 that drive an LED assembly 530 along the lines of the circuitry shown in FIG. 5, with the addition of a snubber circuit 512, including a resistor R3, a capacitor C3 and a capacitor C4. The snubber circuit 512 may limit voltage developed across the input of the rectifier circuit 510 due to the inductance L of the wires that couple the apparatus 600 to a ballast.

Figure 7:
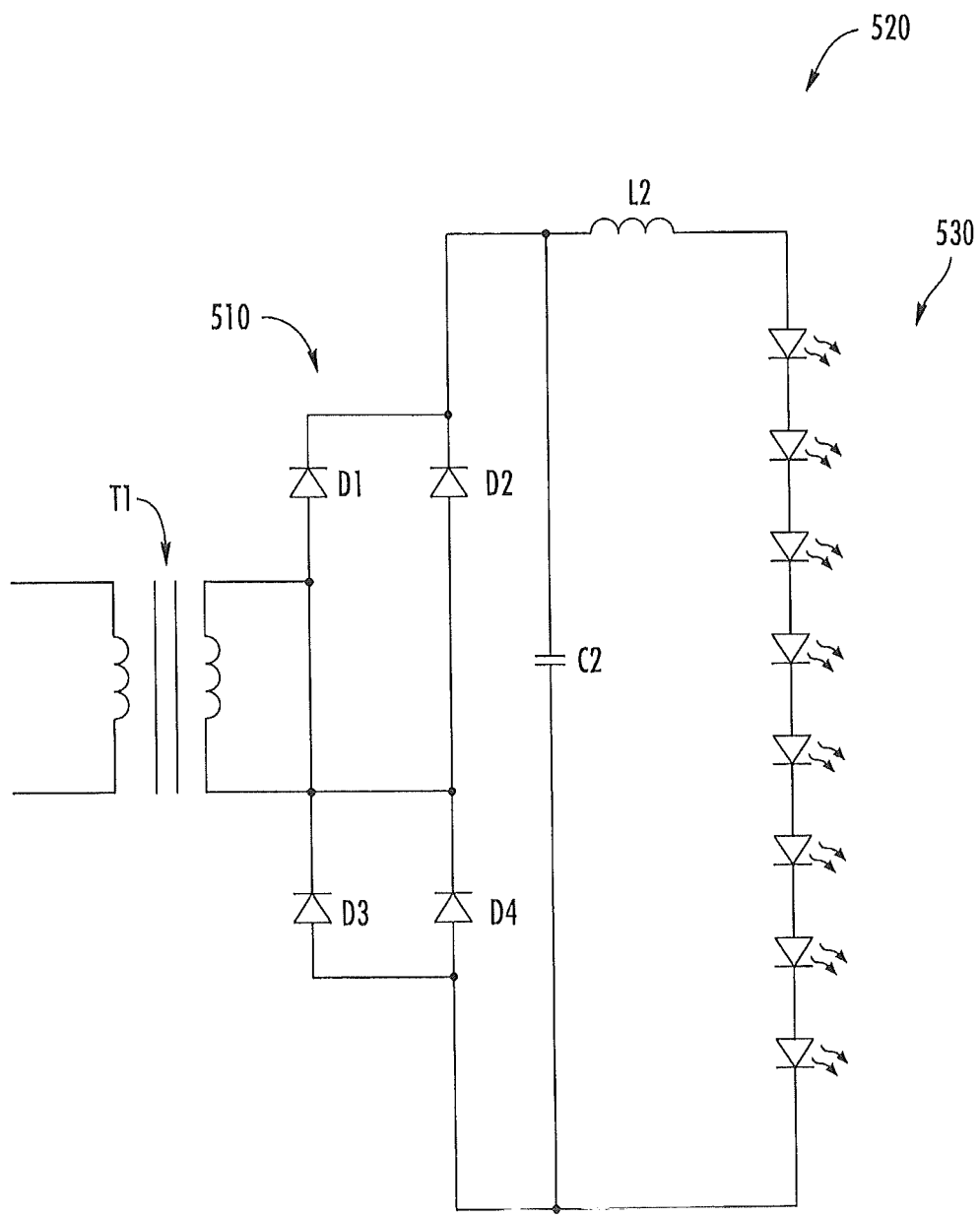
FIG. 7 is a schematic diagram illustrating a galvanic isolation of a lighting apparatus according to some embodiments.

Galvanic isolation may also be provided. For example, as shown in FIG. 7, a lighting apparatus 700 may include a diode bridge rectifier circuit 510, an CL resonant circuit 520 coupled to an output of the rectifier circuit 510, and an LED assembly 530 including a string of LEDs, which may operate as described above. The input of the rectifier circuit 510 is coupled to a ballast using an isolating transformer T1. In particular, a secondary winding of the transformer T1 may be coupled to the input of the diode bridge rectifier circuit 510, and a primary winding of the transformer T1 may be coupled to the output of a ballast.

Embodiments of the inventive subject matter may be arranged in a number of different physical forms. These forms may include, but are not limited to, complete lighting apparatus, replacement lamps, lamp replacement sets (or kits) and/or modules or other circuit assemblies for lamp replacement applications. Replacement lamps may be, for example, plug-in or screw-in replacements for conventional fluorescent tubes, CFLs or other types of lamps that use ballasts that produce AC outputs, such as HID lamps. Lamp replacement kits or sets may include, for example, one or more lamps configured to be plugged or screwed into one or more existing lamp connectors (e.g., screw-in or plug-in sockets, clamps or other electrical connectors), along with circuit modules that are configured to interface the fixture connectors to a ballast using, for example, spliced connections in existing wiring and/or replacement wiring harnesses or sets.

Figure 8:
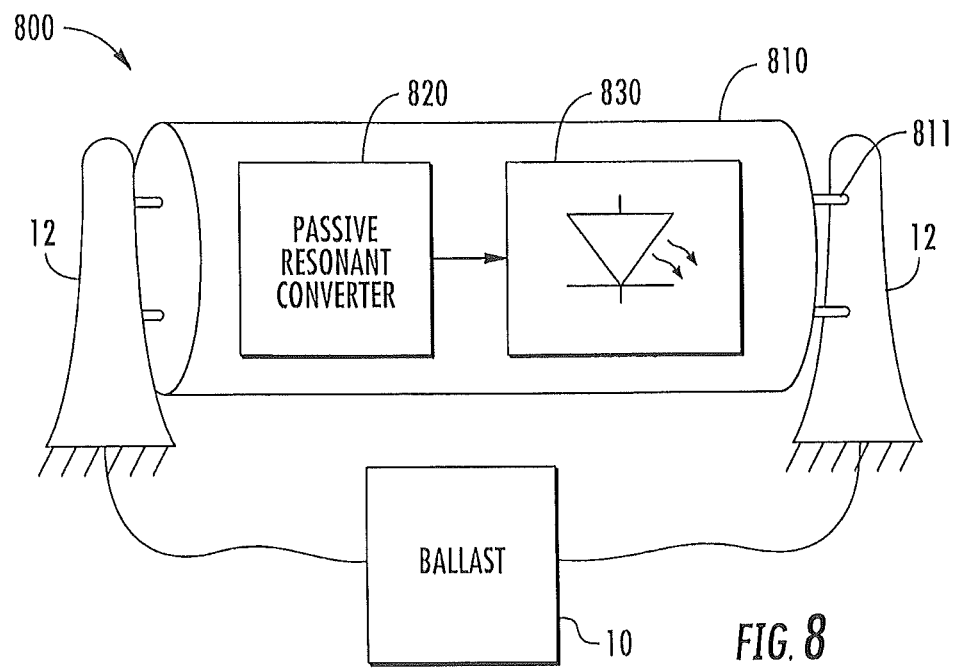
FIG. 8 illustrates a lamp according to some embodiments.
Figure 9:
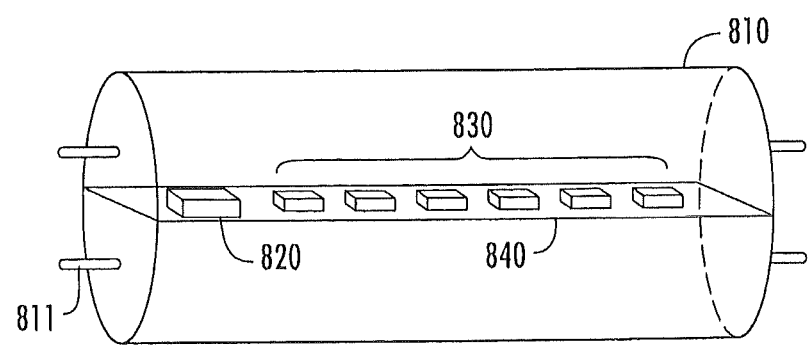
FIG. 9 illustrates a physical arrangement for the lamp of FIG. 8.

For example, FIG. 8 illustrates an LED-based replacement lamp 800 for fluorescent tube lamp replacement. The replacement lamp 800 includes an at least partially translucent housing 810. At least one LED 830 is positioned in the housing 810 and configured to provide illumination through at least one translucent portion of the housing 810. The at least one LED 830 is coupled to an output of a passive resonant converter circuit 820, which may have a form along the lines discussed above. An input of the passive resonant converter circuit 820 is coupled to at least one external contact of the lamp 800, here shown as at least one of pins 811 configured to mate with contacts of lamp sockets 12. The contacts of the lamp socket 812 are coupled to a ballast, e.g., a ballast originally used to drive a conventional fluorescent tube. FIG. 9 illustrates an example of an internal physical layout of the replacement tube 800, including the passive resonant converter circuit 820 and LEDs 820 supported on a substrate 840, e.g., a printed circuit board and/or other supporting structure that provides mechanical support and that facilitates electrical interconnection of these components using, for example, circuit traces and/or wires. In some embodiments in which the lamp 800 is for use in a fluorescent fixture designed for use with fluorescent lamps with multiple pins (e.g., a tube with two pins on each end), the passive resonant converter circuit 820 may be connected to only some of the pins (e.g., one on each end of the tube), with one or more of the other pins being dummy pins that provide mechanical support and/or alignment but are not used for electrical contact.

Figure 10:
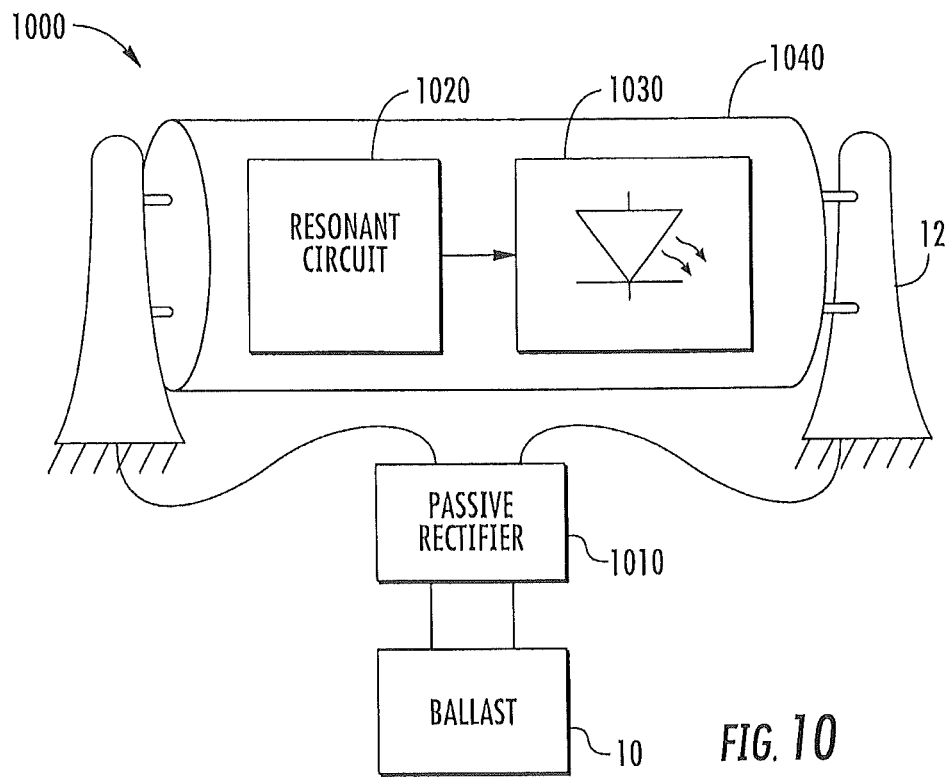
FIGS. 10-12 fluorescent lamp replacement arrangements according to various embodiments.

According to further embodiments, a lamp may be configured to include a portion of a passive resonant converter circuit, with other portions of the passive resonant converter circuit positioned outside of the lamp and connected thereto via wiring, such that the lamp and external circuitry serve as a lamp replacement set or kit. For example, FIG. 10 illustrates a lamp 1000 including at least one LED 1030 and a resonant circuit 1020 (e.g., a resonant CL circuit as described above with reference to FIGS. 3-7) positioned in an at least partially translucent housing 1040. The lamp 1000 is coupled to an external passive rectifier circuit 1010, which may take the form, for example, of a module that may be spliced into existing wiring or otherwise electrically connected to a ballast 10 and lamp sockets 12 in a fluorescent lighting fixture.

Figure 11:
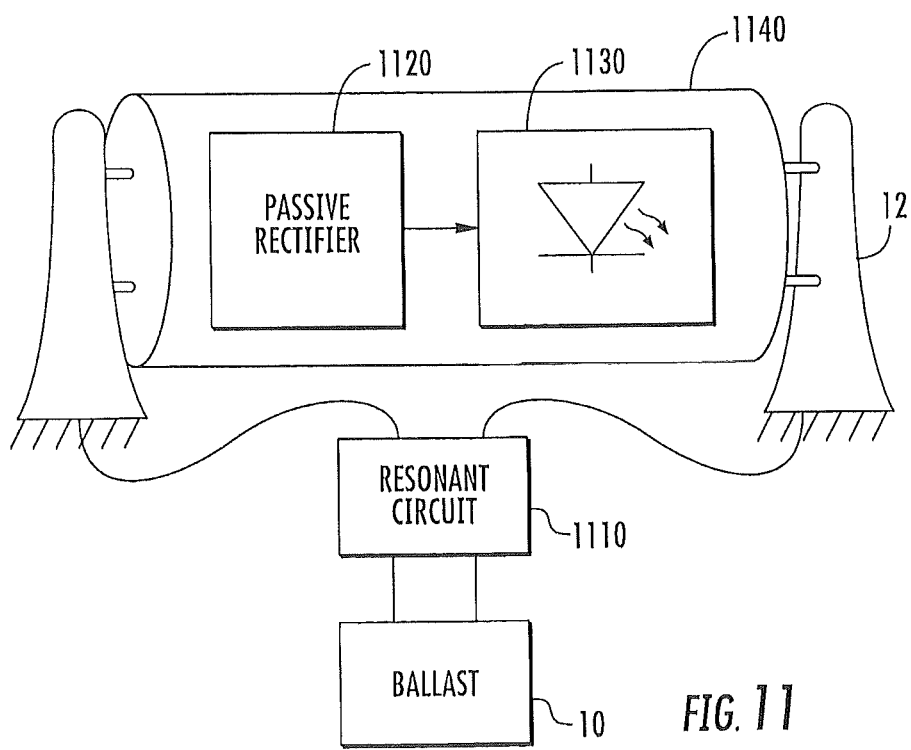

As shown in FIG. 11, a lamp replacement set or kit may include a lamp 1100 which is configured to be connected to lamp sockets 12 and which includes at least one LED 1130 coupled to a passive rectifier circuit 1120 inside a lamp housing 1140. An external resonant circuit 1110 may be coupled to the lamp 1100 via the sockets 12, and may comprise, for example, a module configured to be spliced into existing wiring or otherwise connected between a ballast 10 and the lamp sockets 12.

Figure 12:
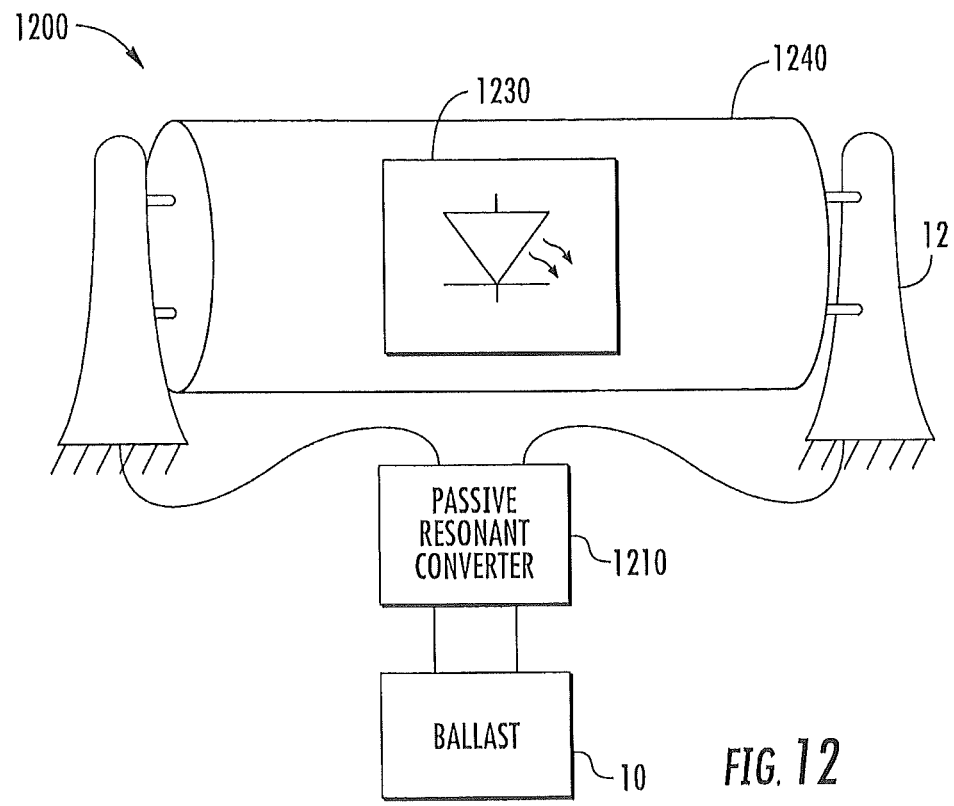

In still further embodiments illustrated in FIG. 12, a lamp replacement set or kit may include a lamp 1200 including at least one LED 1230 positioned in a lamp housing 1240. The at least one LED 1230 may be coupled to a passive resonant converter circuit 1210 along the lines described above via lamp sockets 12. The passive resonant converter circuit 1210 may be configured, for example, as a module configured to be spliced into existing wiring or otherwise connected between a ballast 10 and the lamp sockets 12.

Figure 13:
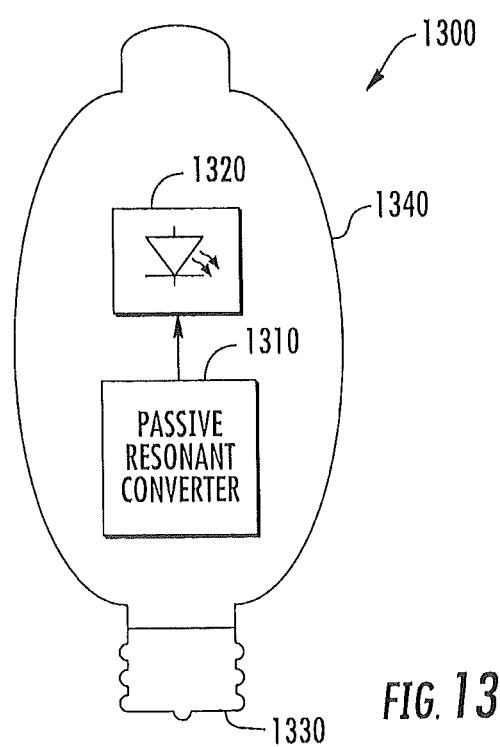
FIG. 13 illustrates a lamp for high intensity discharge (HID) lighting applications according to some embodiments.

As noted above, some embodiments of the inventive subject matter are applicable to other types of ballast-driven lighting devices, including gas-discharge lamp devices such as HID devices (e.g., mercury vapor, metal halide, sodium vapor, xenon arc, etc.), low pressure sodium devices and CFLs. For example, FIG. 13 illustrates an LED replacement lamp for HID lamp devices. The lamp 1300 includes at least one LED 1320 coupled to a passive resonant converter circuit 1310 housed within an at least partially translucent housing 1340. The passive resonant converter circuit 1310 is configured to be coupled to an external ballast via a screw-type base 1330. It will be appreciated that portions of the passive resonant converter circuit could also be positioned external to the lamp 1300, e.g., in one or more modules configured to be connected between the lamp base 1330 and the ballast, in ways analogous to those described above with reference to FIGS. 10-12.

Figure 14:
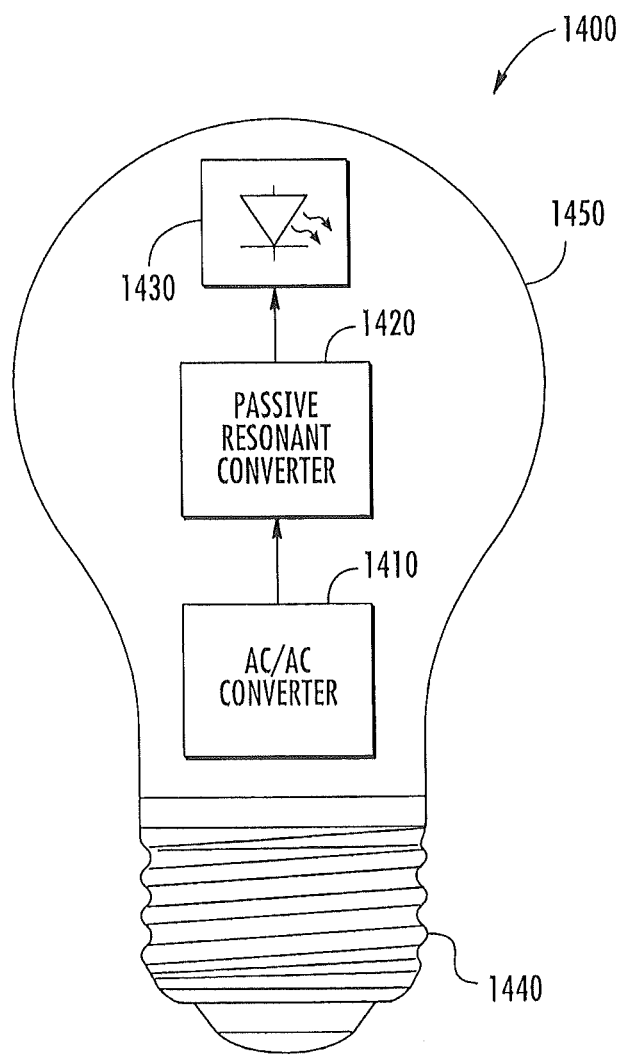
FIG. 14 illustrates an LED lamp according to some embodiments.

In some embodiments, a passive resonant converter circuit along the lines discussed above may be packaged with an AC/AC converter circuit in a lamp or other lighting assembly. For example, as shown in FIG. 14, an AC/AC converter circuit 1410, passive resonant converter circuit 1420 and one or more LED's 1430 may be integrated in a housing 1450 of a lamp 1400 and configured to be coupled to an AC power source through a screw-type base 1440 or via some other electrical connector. The AC/AC converter circuit 1410 may take the form of the ballast circuits 10 shown, for example, in FIGS. 4-5.

Figure 15:
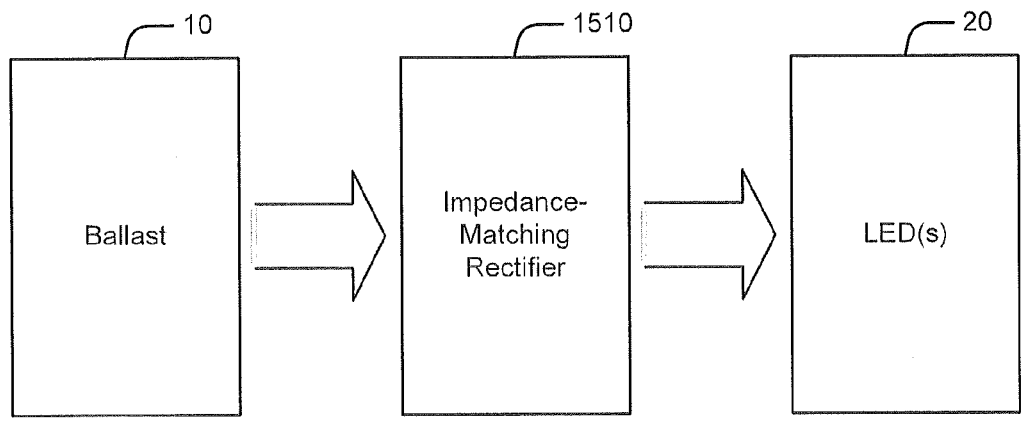
FIG. 15 illustrates an interface apparatus according to some embodiments.
Figure 16:
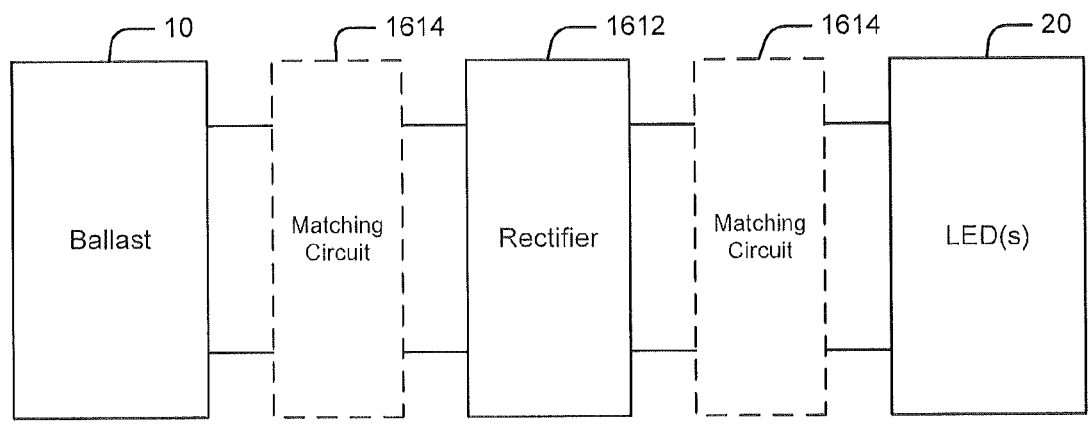
FIG. 16 illustrates an interface apparatus including a rectifier circuit and matching network according to some embodiments.

As noted above, apparatus for interfacing one or more LEDs to a ballast may take many different forms. As shown in FIG. 15, for example, a lighting apparatus may include one or more LEDs 20 interfaced to a ballast 10 using an impedance matching rectifier circuit 1510 that includes a combination of a rectifier and an impedance matching circuit, such as the resonant circuits discussed above, that substantially matches an impedance of the ballast 10 such that power transfer between the ballast 10 and the one or more LED's is maximized. Such a circuit may also reduce ripple current in the LED load. As shown in FIG. 16, such an impedance-matching rectifier circuit may include, for example, a rectifier circuit 1612 and a matching network 1614 that may include components on one or both of the input and output sides of the rectifier circuit 1612.

Figure 17:
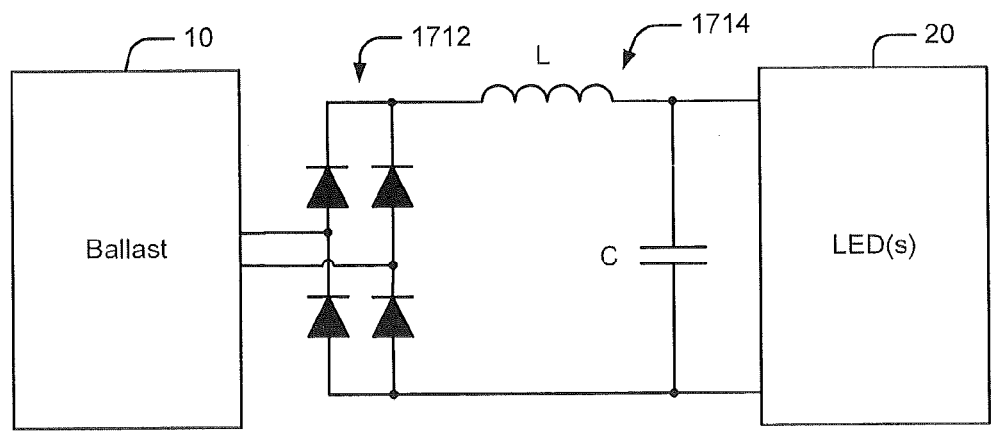
FIGS. 17-20 illustrate lighting interface apparatus with various arrangements of LC impedance matching networks and passive rectifier circuits according to some embodiments.
Figure 18:
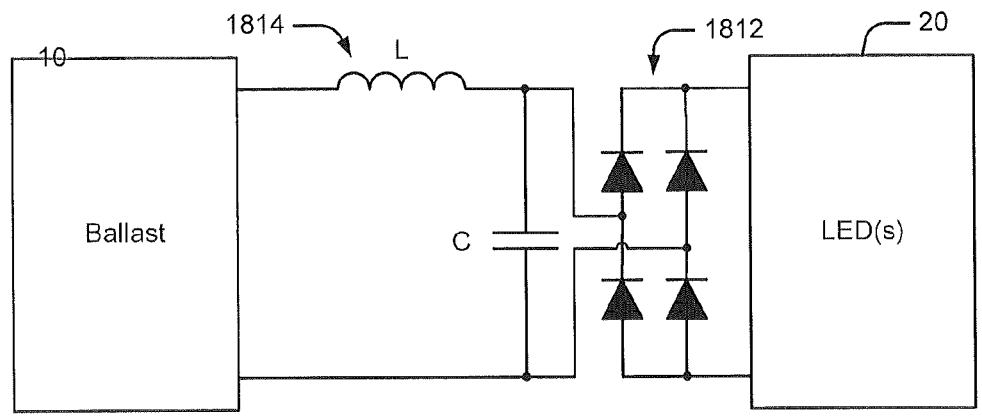
Figure 19:
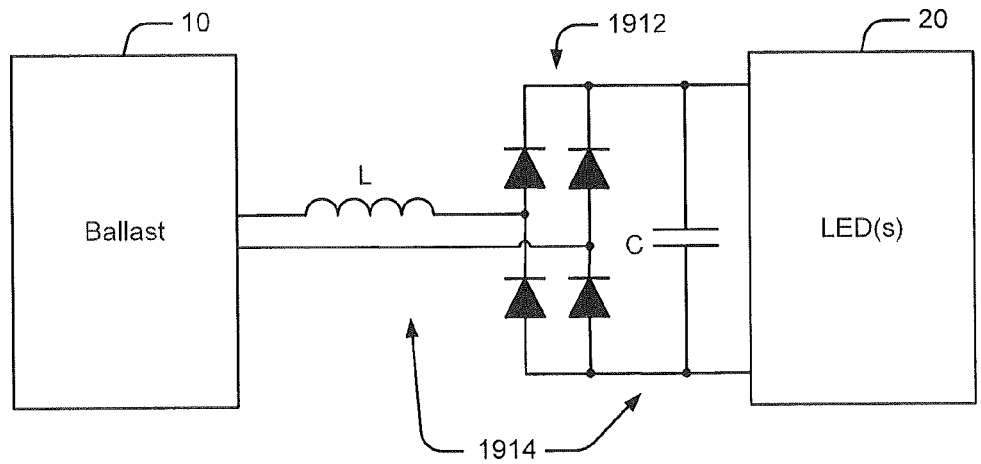
Figure 20:
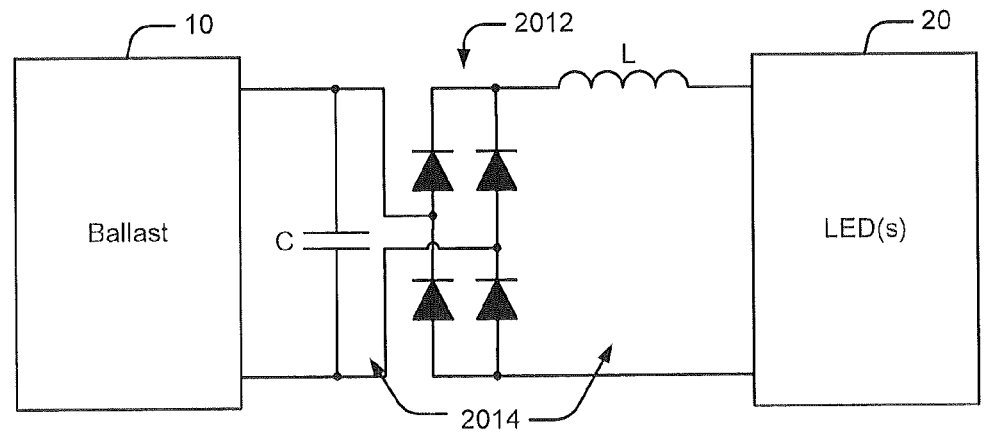

An example of such circuitry is shown in FIG. 3, described above. A variety of other arrangements may be used in various other embodiments. As shown in FIG. 17, for example, circuitry for interfacing a ballast 10 to one or more LEDs 20 may include a full-wave bridge diode rectifier circuit 1712 having an input configured to be coupled to the ballast 10 and an output coupled to a resonant matching circuit 1714 including an inductor L and capacitor C. In further embodiments illustrated in FIG. 18, interface circuitry may include a similar matching circuit 1814 rearranged to the input side of a rectifier circuit 1812. As shown in FIGS. 19 and 20, components of matching circuits 1914, 2014 may be distributed on both sides of rectifier circuits 1912, 2012.

Figure 21:
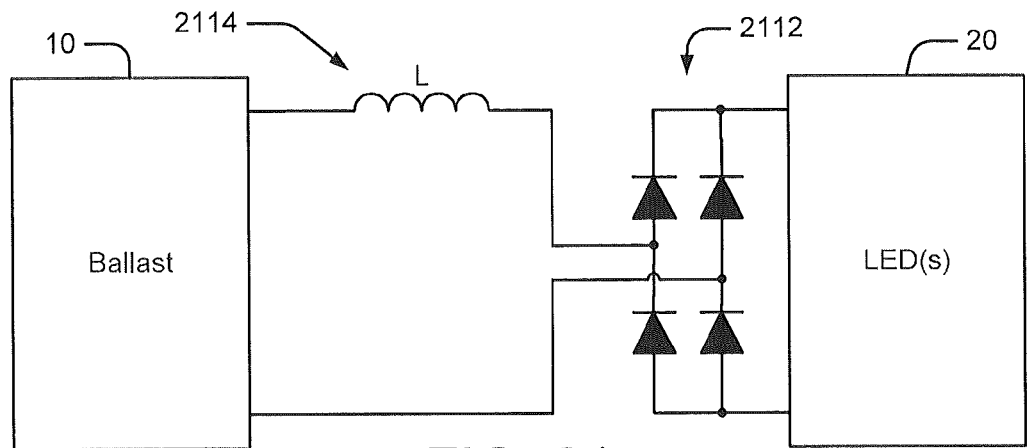
FIGS. 21 and 22 illustrate interface apparatus using matching networks including inductors according some embodiments.
Figure 22:
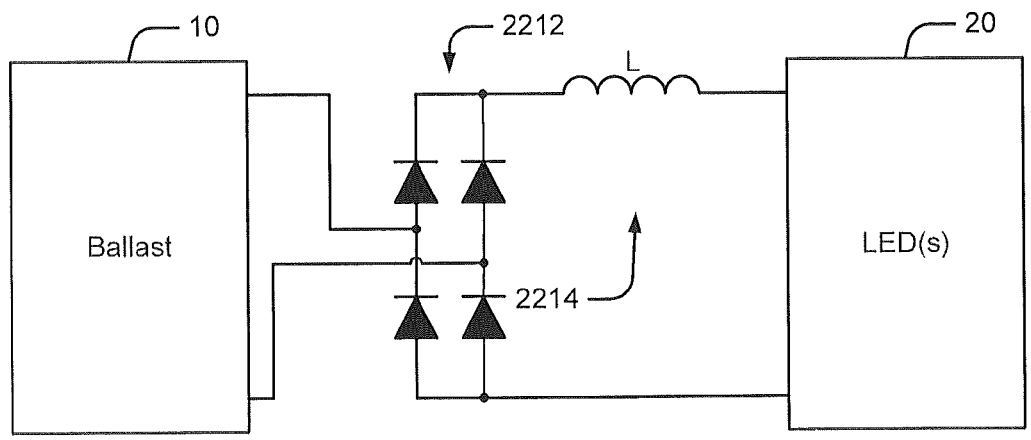
Figure 23:
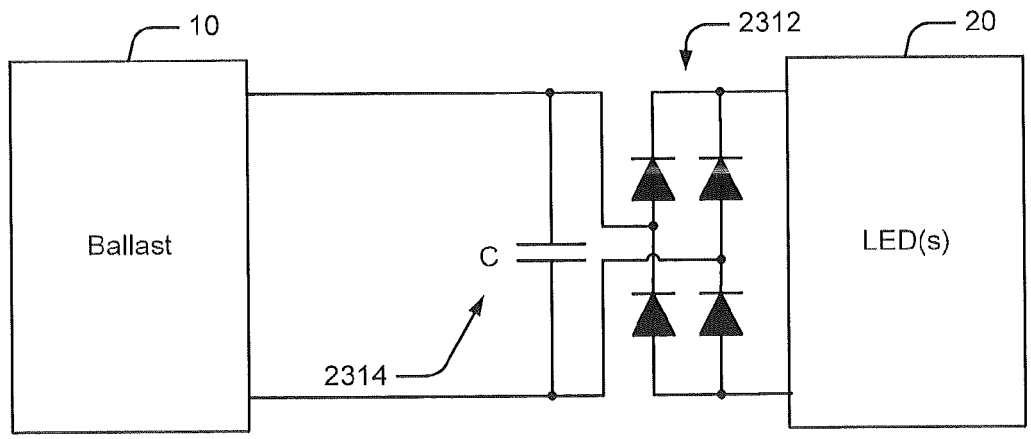
FIGS. 23 and 24 illustrate interface apparatus using matching networks including capacitors according some embodiments.
Figure 24:
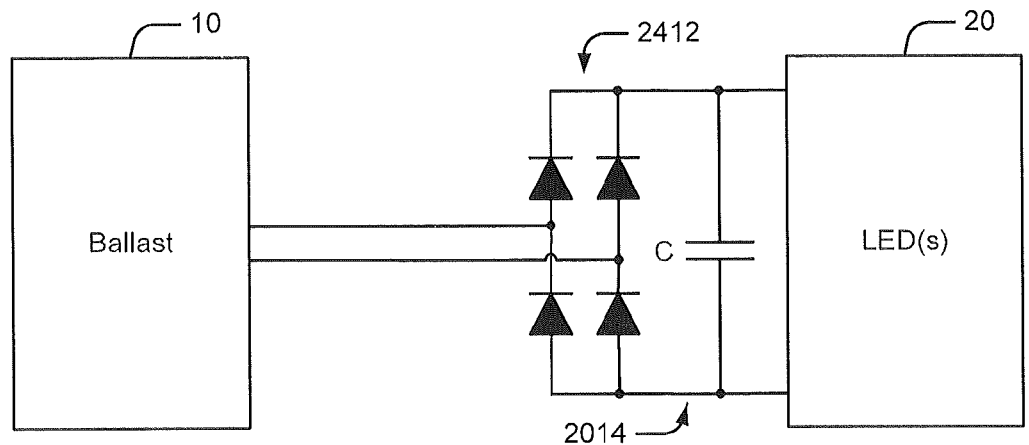
Figure 25:
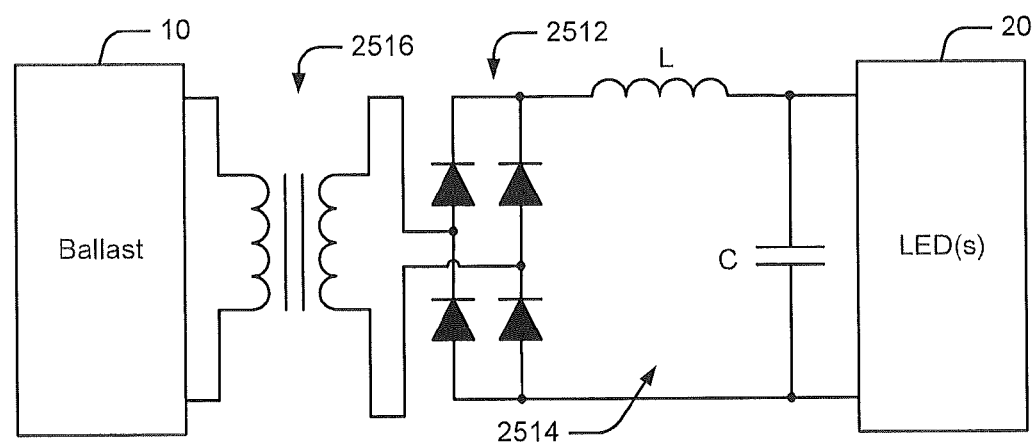
FIGS. 25-35 illustrate interface apparatus with isolation transformers according to further embodiments.
Figure 26:
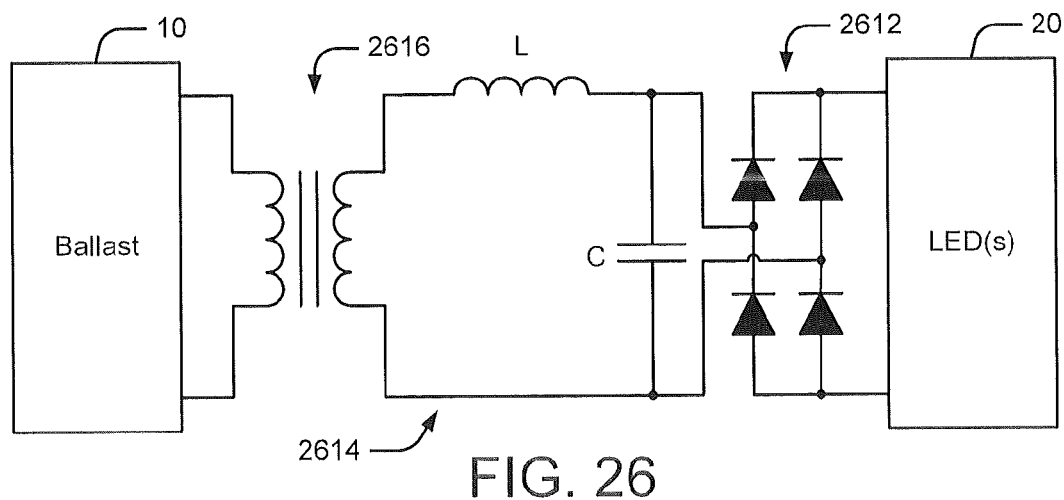
Figure 27:
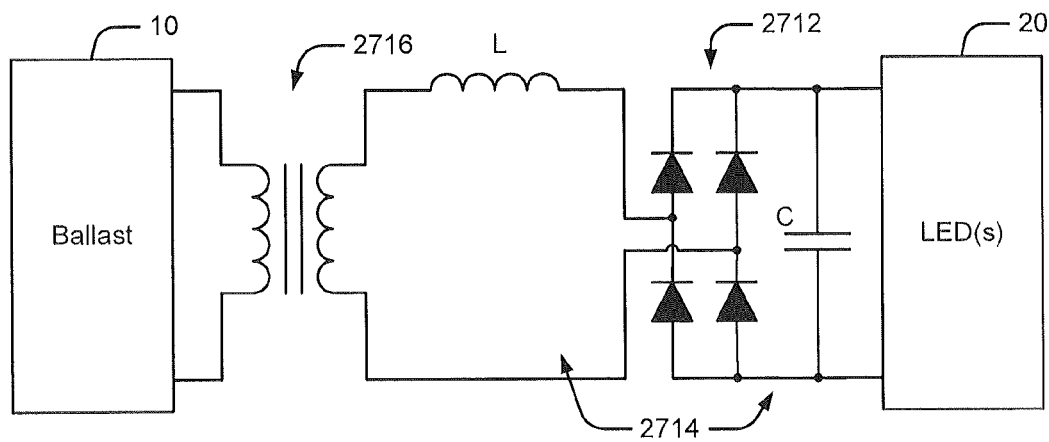
Figure 28:
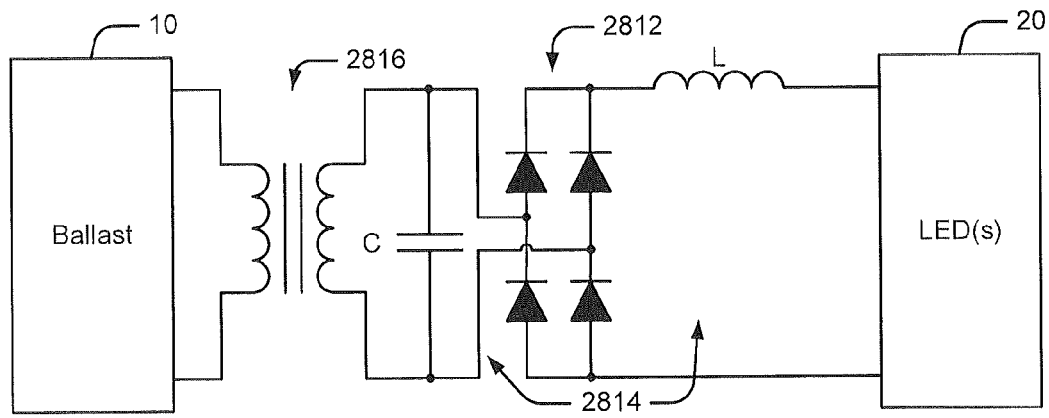
Figure 29:
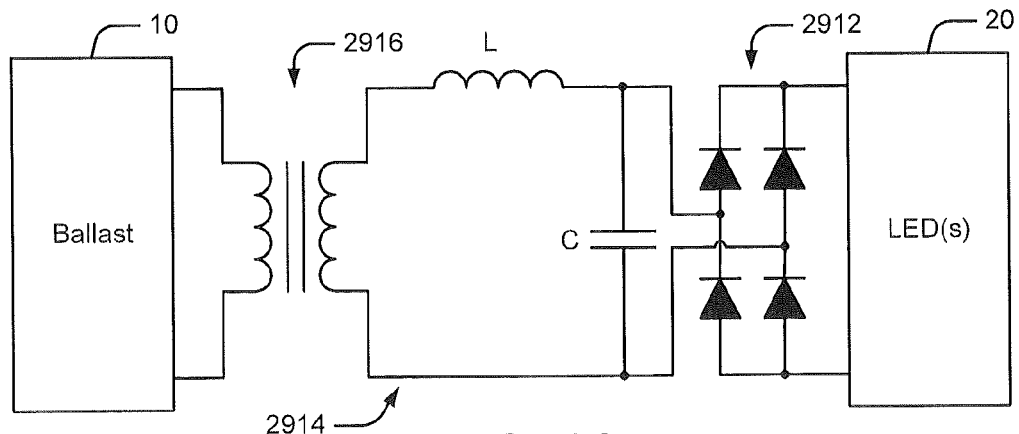
Figure 30:
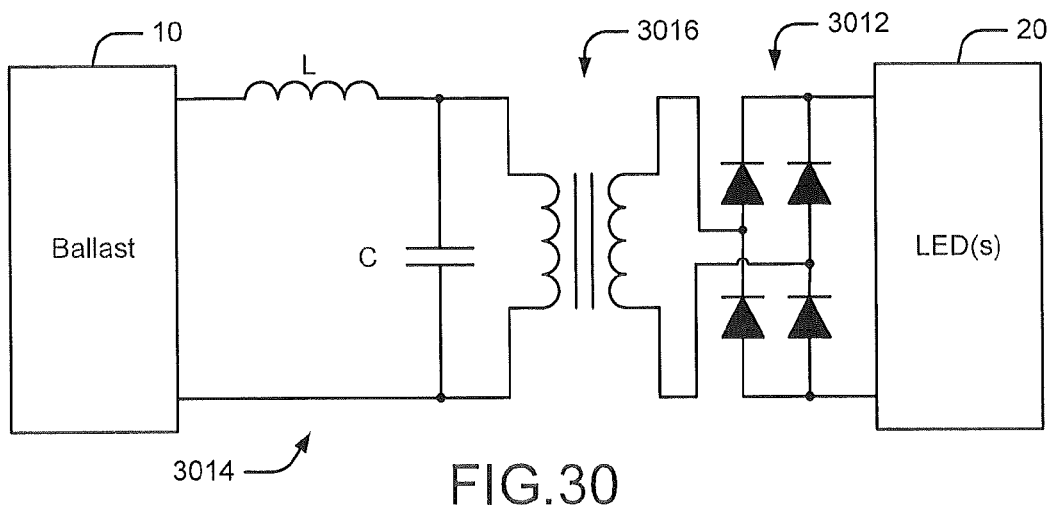
Figure 31:
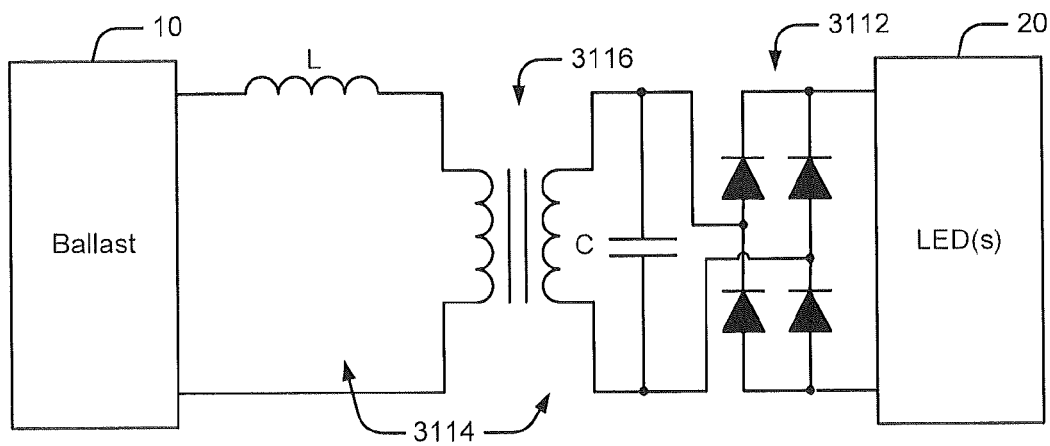
Figure 32:
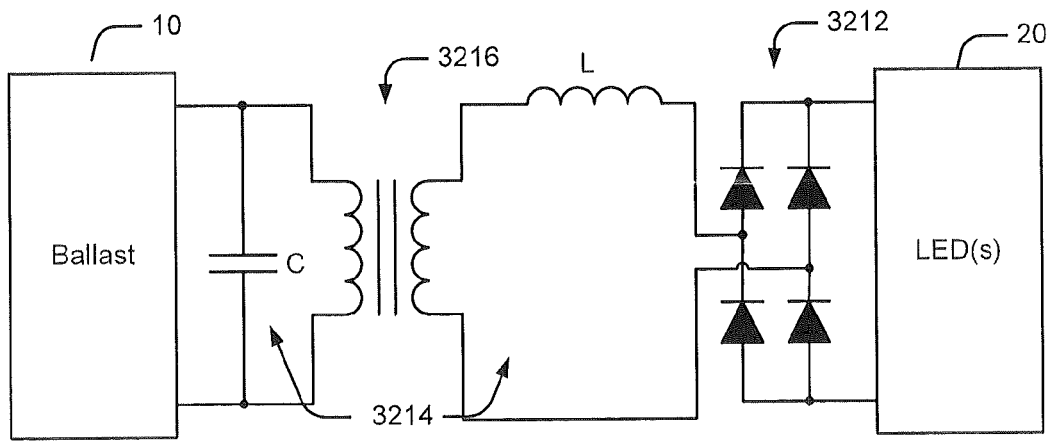

In some embodiments, a lesser number of matching circuitry components may be provided. For example, as shown in FIGS. 21 and 22, matching circuitry 2114, 2214 may include one or more inductors L arranged on input and/or output sides of a rectifier circuit 2112, 2212. Such arrangements may be used, for example, where the one or more LEDs 20 may include an associated capacitance that, in conjunction with the one or more inductors L, provides similar functionality to the resonant matching circuits described above. Similarly, as shown in FIGS. 23 and 24, matching circuitry 2314, 2414 may be limited to one or more capacitors C arranged on input and/or output sides of a rectifier circuit 2312, 2412.

Figure 33:
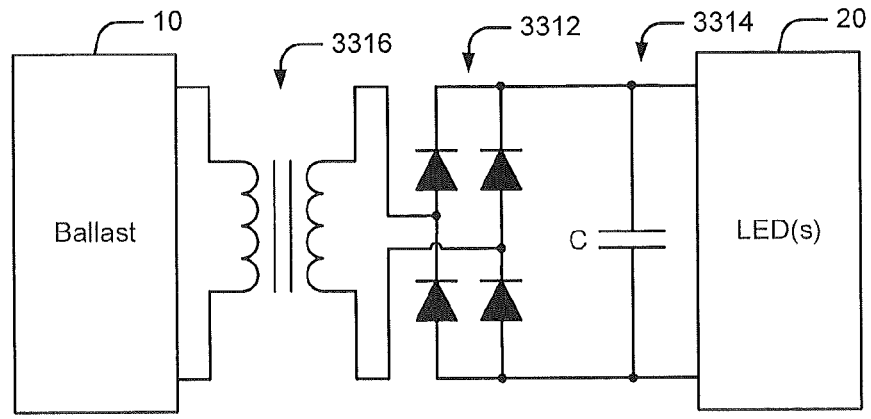
Figure 34:
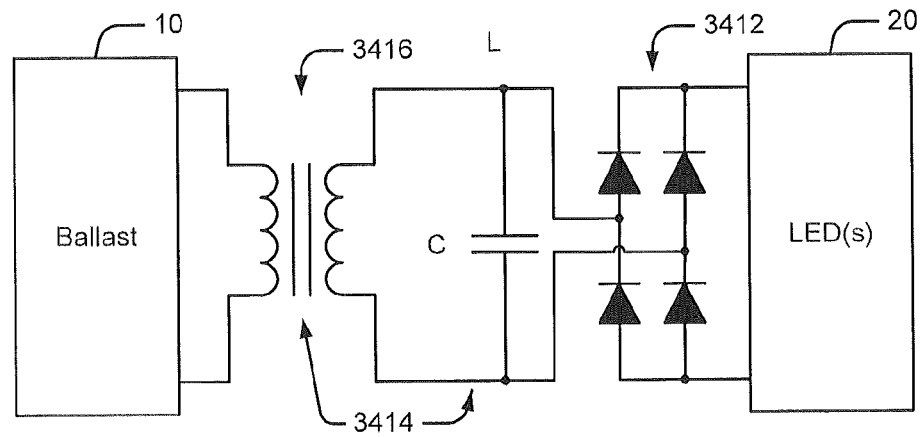
Figure 35:
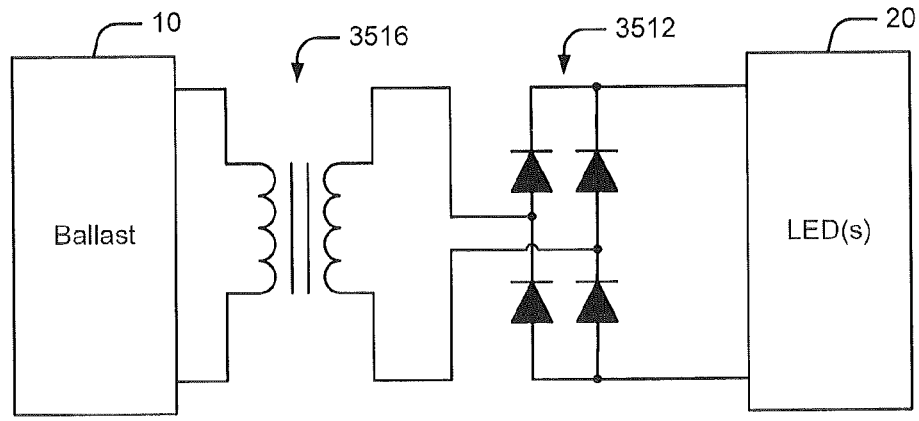

As also discussed above, interface circuitry may provide galvanic isolation and voltage transformation using a transformer, which may also provide inductance for impedance matching. For example, FIGS. 25-32 illustrate interface circuitry including various arrangements of a rectifier circuit 2512, 2612, 2712, 2812, 2912, 3012, 3112, 3212, a transformer 2516, 2616, 2716, 2816, 2916, 3016, 3116, 3216 and an impedance matching circuit 2514, 2614, 2714, 2814, 2914, 3014, 3114, 3214 with at least one inductor L and at least one capacitor C arranged on various sides of the rectifier circuit 2512, 2612, 2712, 2812, 2912, 3012, 3112, 3212. It will be appreciated that inductance (e.g., the leakage inductance) of the transformer 2516, 2616, 2716, 2816, 2916, 3016, 3116, 3216 may serve as part of the inductance of the impedance matching circuit 2514, 2614, 2714, 2814, 2914, 3014, 30114, 3214. As shown in FIGS. 33 and 34, if a transformer 3316, 3416 of interface circuitry is designed to provide appropriate inductance, additional inductors may be eliminated, such that, for example, an impedance matching circuit 3314, 3414 is provided by the transformer 3316, 3416 and one or more capacitors C arranged on input and/or output sides of a rectifier circuit 3312, 3412. As shown in FIG. 35, in some embodiments, the one or more capacitors may be omitted, and an impedance matching circuit may be provided by a transformer 3516 coupled to a rectifier circuit 3512.

It will be understood that, in general, any of a variety of different impedance matching circuits may be used, including other resonant circuits, such as higher order LC circuits including different combinations of inductors and capacitors. The nature of such circuitry may depend, for example, on the nature of the impedance of the ballast driving the lighting circuit.

Figure 36:
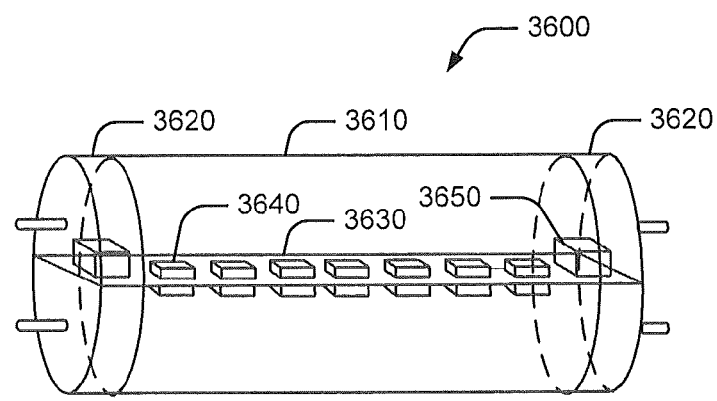
FIGS. 36 and 37 illustrate lamps using interface circuitry contained within one or more end caps according to some embodiments.
Figure 37:
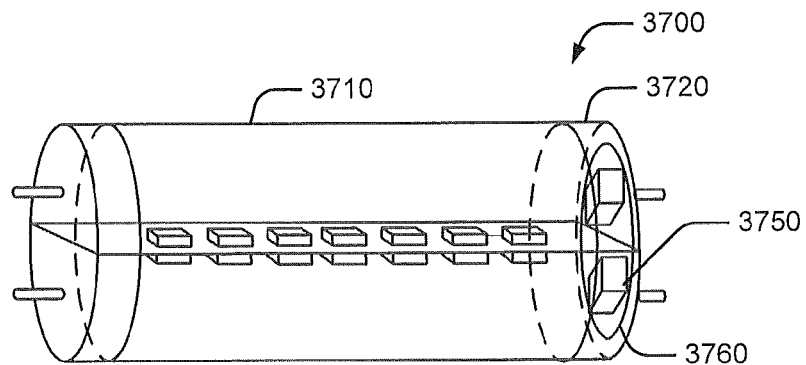

As further discussed above, embodiments of the inventive subject matter may have any of a variety of different physical arrangements. FIG. 36 illustrates a lamp 3600 including a substrate 3630 having LEDs 3640 mounted thereon. Components 3650 of an interface circuit along the lines described above, e.g., any of the various interface circuits described above with reference to FIGS. 15-35, may be positioned within the lamp 3600, such as contained within one or both non-translucent end caps 3620 of the lamp 3600, such that these components do not obscure light emission from the LEDs 3640. As shown in FIG. 37, a lamp 3700 may include including a substrate 3730 having LEDs 3740 mounted thereon, with components 3750 of an interface circuit mounted on a substrate 3760 underlying one or more end caps 3720 of the lamp 3700. It will be appreciated that other arrangement may be used, such as arrangements in which interface circuit components are interspersed among LEDs on a substrate in a manner that avoids significant light obstruction. For example, in a tube lamp implementation, LEDs may be mounted on an outer surface of a rigid cylindrical substrate or a flexible substrate configured to be formed into a tube-like shape, and interface circuit components may be contained within the inner volume defined by the substrate.

Figure 38:
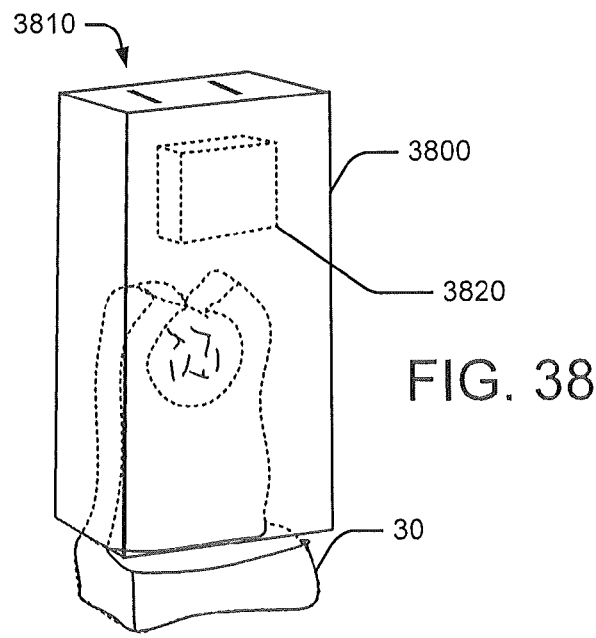
FIG. 38 illustrates a lamp connector adapter with interface circuitry according to further embodiments.

In further embodiments, interface circuitry along the lines described above may be located in an adapter that is configured to mechanically interface an LED lighting assembly to a lamp connector. For example, FIG. 38 illustrates lamp connector adapter 3800 according to some embodiments. The adapter 3800 is configured to be connected to a lamp connector, such as a fluorescent tube "tombstone" connector 30. Interface circuitry, such as the various interface circuits described above with reference to FIGS. 15-35, may be housed in the adapter 3800. The adapter 3800 may include a connector 3810 configured to connected to an external LED assembly. One or more such adapters may be used, for example, to convert a fluorescent tube-type troffer or other lighting device for use with an LED assembly having a form factor, such as a strip, that is different from the tubular form of a fluorescent tube. Example embodiments of a lamp suitable for use as an LED based lamp in a fluorescent lighting system are described in a related application entitled "LED LAMP" by Medendorp et al., U.S. Patent Application.

No. 13/943,152, filed Jul. 16, 2013, the disclosure of which is incorporated by reference in its entirety.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus for interfacing a ballast to at least one light emitting diode (LED), the apparatus comprising:
    a passive rectifier circuit; and
    a matching circuit coupled at an input port and/or an output port of the passive rectifier circuit and configured to at least partially match an impedance of the ballast, wherein the at least one LED is provided in a housing and mounted on a substrate contained within a translucent portion of the housing, wherein the housing comprises non-translucent first and second end caps that cap respective ones of the first and second ends of the elongated housing and wherein the passive rectifier circuit and the matching circuit are at least partially contained within at least one of the first and second end caps.

2. The apparatus of claim 1, wherein the matching circuit is configured to couple the at least one LED to the passive rectifier circuit.

3. The apparatus of claim 1, wherein the passive rectifier circuit is configured to couple the at least one LED to the matching circuit.

4. The apparatus of claim 1, wherein the matching circuit comprises components on input and output sides of the passive rectifier circuit.

5. The apparatus of claim 1, wherein the matching circuit comprises at least one inductor and/or at least one capacitor.

6. The apparatus of claim 1, wherein the matching circuit comprises at least one inductor coupled in series with an input of the passive rectifier circuit and/or an output of the passive rectifier circuit.

7. The apparatus of claim 1, wherein the matching circuit comprises at least one capacitor coupled at an output of the passive rectifier circuit and/or at an input of the passive rectifier circuit.

8. The apparatus of claim 1, further comprising a transformer configured to couple the passive rectifier circuit to the ballast.

9. The apparatus of claim 8, wherein the matching circuit comprises an inductance of the transformer.

10. The apparatus of claim 9, wherein the matching circuit comprises at least one capacitor coupled across an input of the passive rectifier circuit and/or across an output of the passive rectifier circuit.

11. The apparatus of claim 8, wherein the matching circuit couples the transformer to the passive rectifier circuit.

12. The apparatus of claim 8, wherein the passive rectifier circuit couples the transformer to the matching circuit.

13. The apparatus of claim 8, wherein the matching circuit comprises components on input and output sides of the passive rectifier circuit.

14. A lamp comprising:
    an elongated housing;
    at least one electrical contact positioned proximate at least one of first and second ends of the housing;
    at least one light emitting diode (LED) positioned in the housing and configured to provide illumination through at least one translucent portion of the housing between the first and second ends;
    a substrate contained within the housing, wherein the at least one LED is mounted on the substrate; and
    an impedance matching passive rectifier circuit at least partially contained within the housing and coupled to the at least one LED and the at least one electrical contact, wherein the housing comprises first and second non-translucent end caps that cap respective ones of the first and second ends of the elongated housing and wherein the impedance matching passive rectifier circuit is at least partially contained within at least one of the first and second end caps.

15. The lamp of claim 14, wherein the impedance matching passive rectifier circuit comprises first and second portions contained within respective ones of the first and second end caps.

16. The lamp of claim 14, wherein at least a portion of the impedance matching passive rectifier circuit is mounted on the substrate.

17. The lamp of claim 16, wherein the substrate comprises a flexible substrate.

* * * * *